Sept. 3, 1940.  W. D. FOSTER ET AL  2,213,212
LIGHT-RESPONSIVE CONTROL MECHANISM
Original Filed April 28, 1926  13 Sheets-Sheet 2

Sept. 3, 1940.  W. D. FOSTER ET AL  2,213,212
LIGHT-RESPONSIVE CONTROL MECHANISM
Original Filed April 28, 1926  13 Sheets-Sheet 3

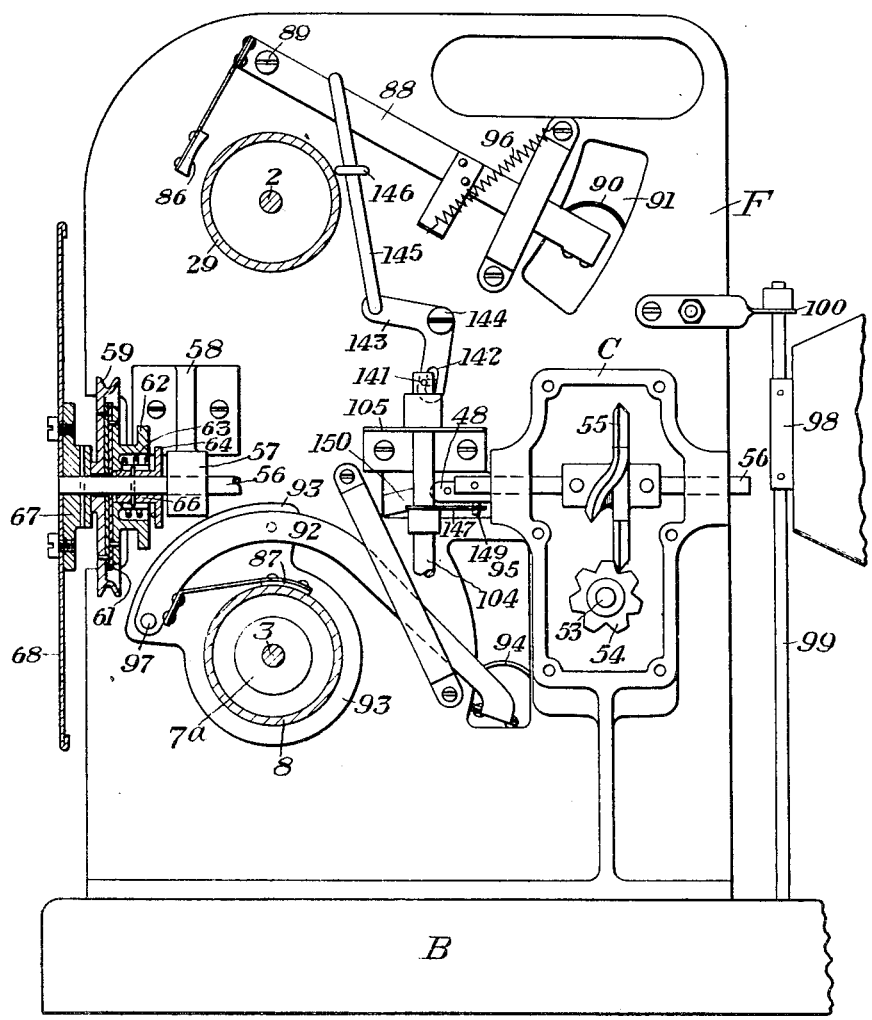

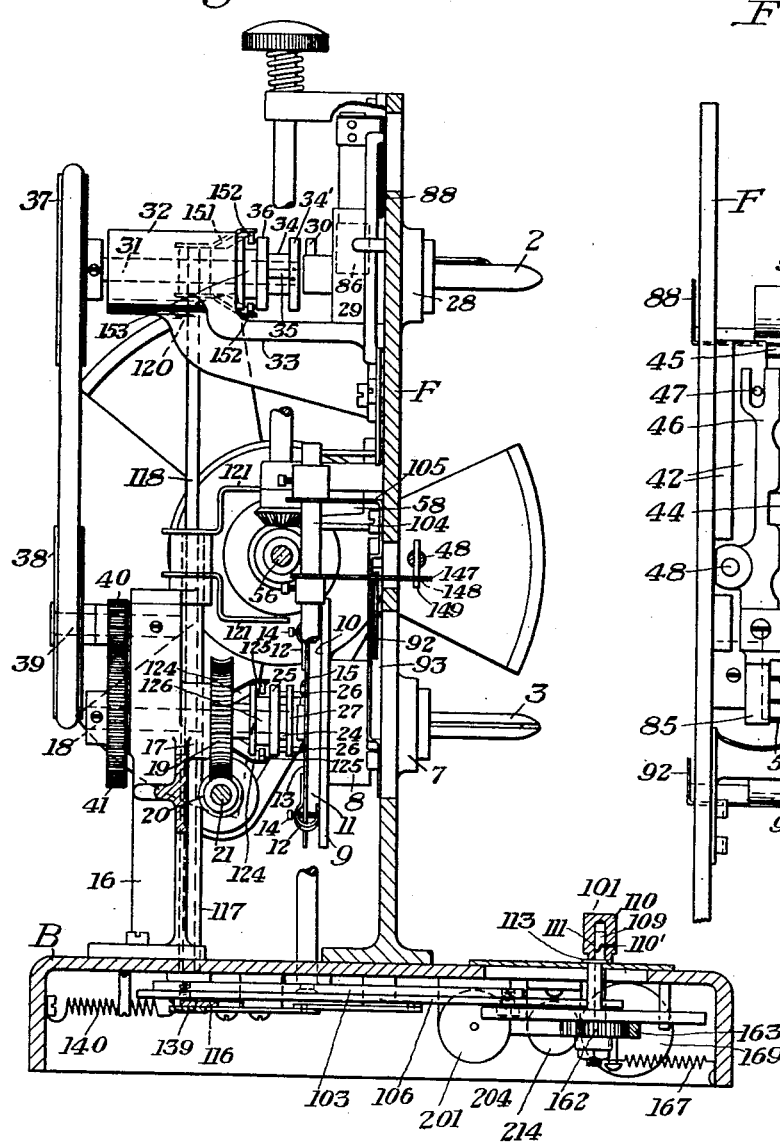

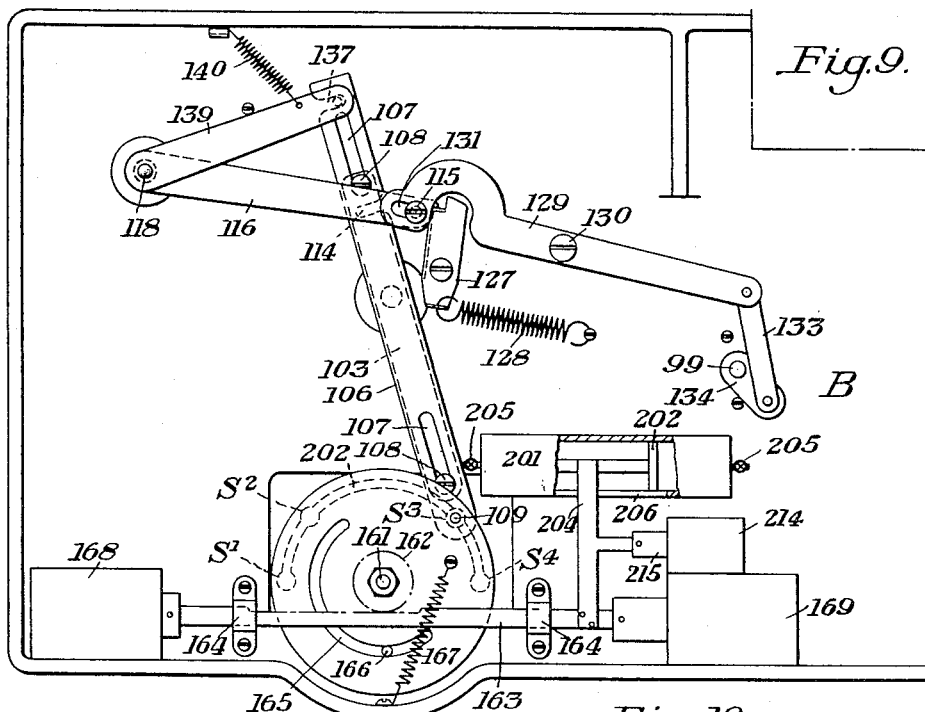
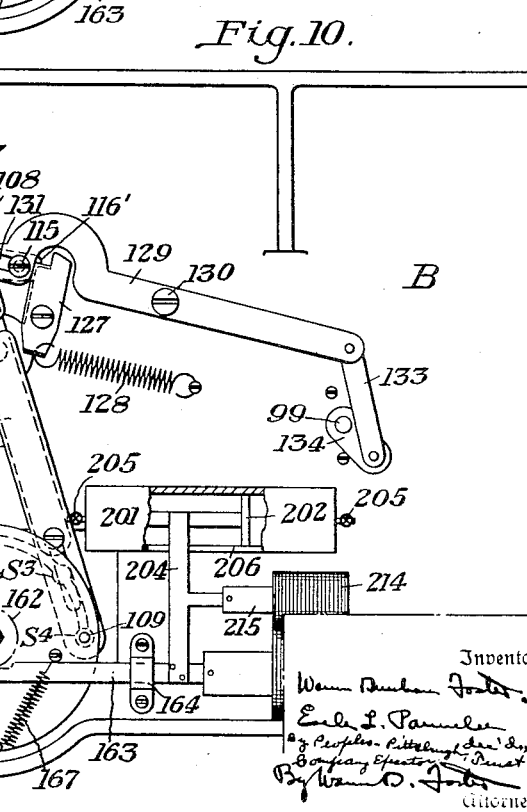

Sept. 3, 1940.  W. D. FOSTER ET AL  2,213,212
LIGHT-RESPONSIVE CONTROL MECHANISM
Original Filed April 28, 1926  13 Sheets-Sheet 8

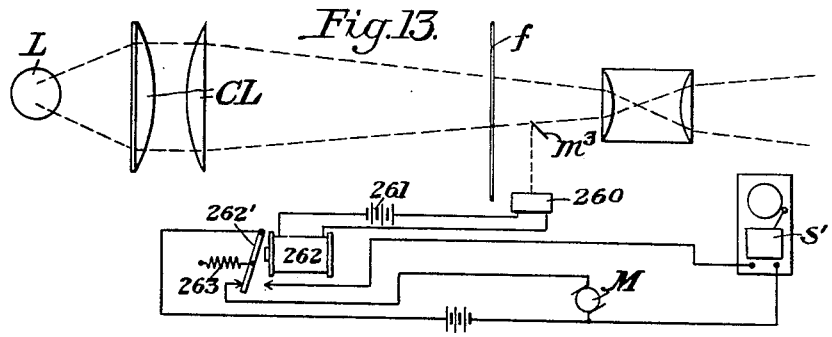
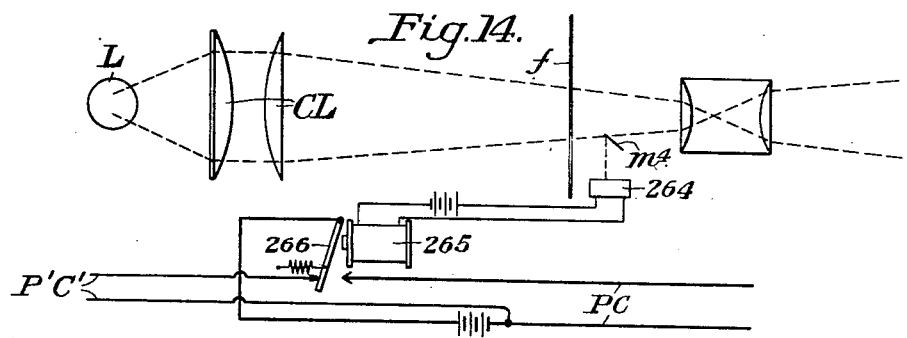
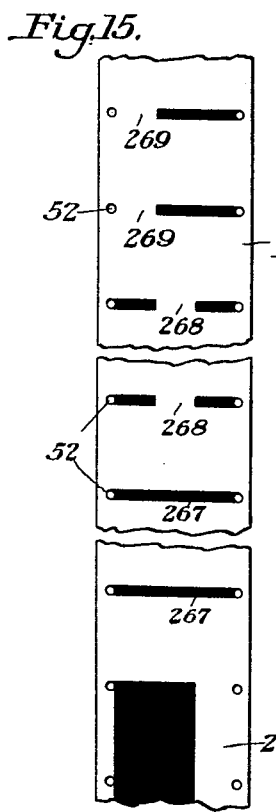
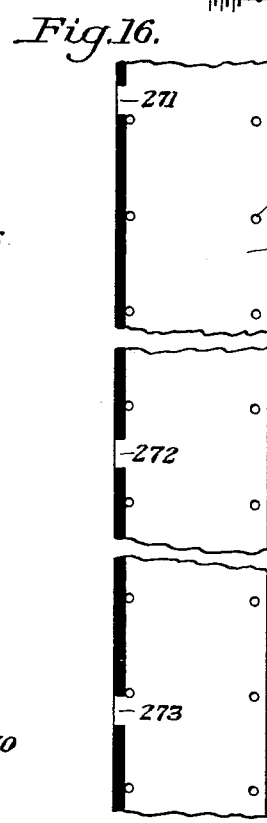
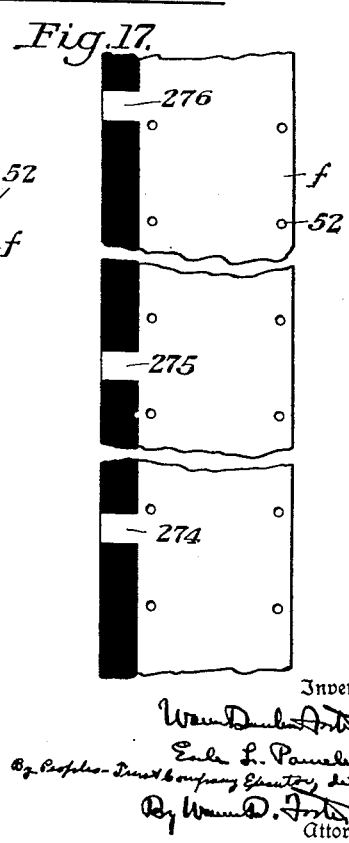

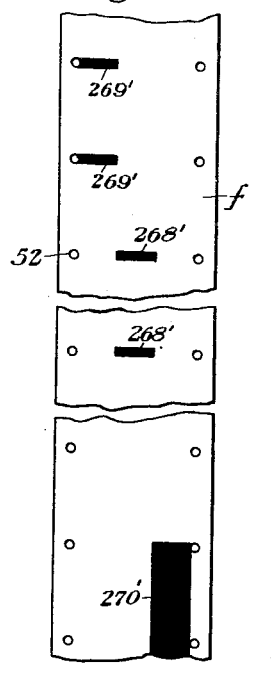
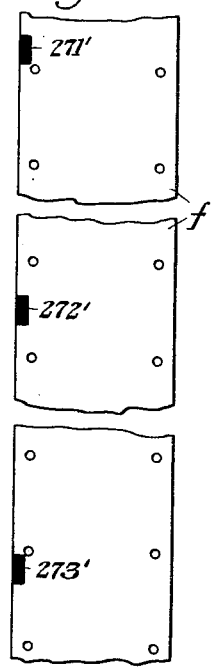
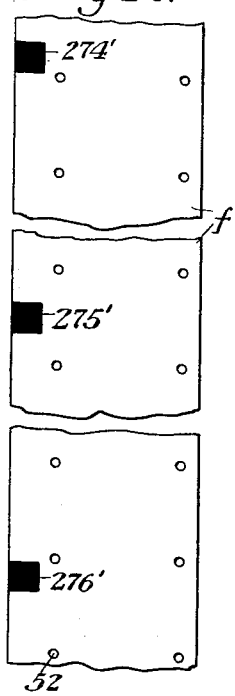
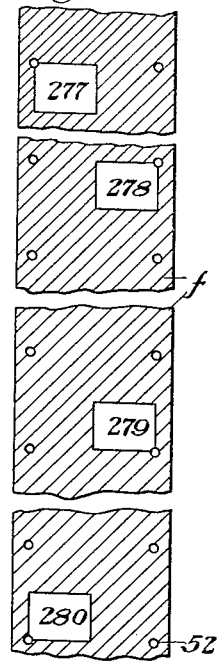
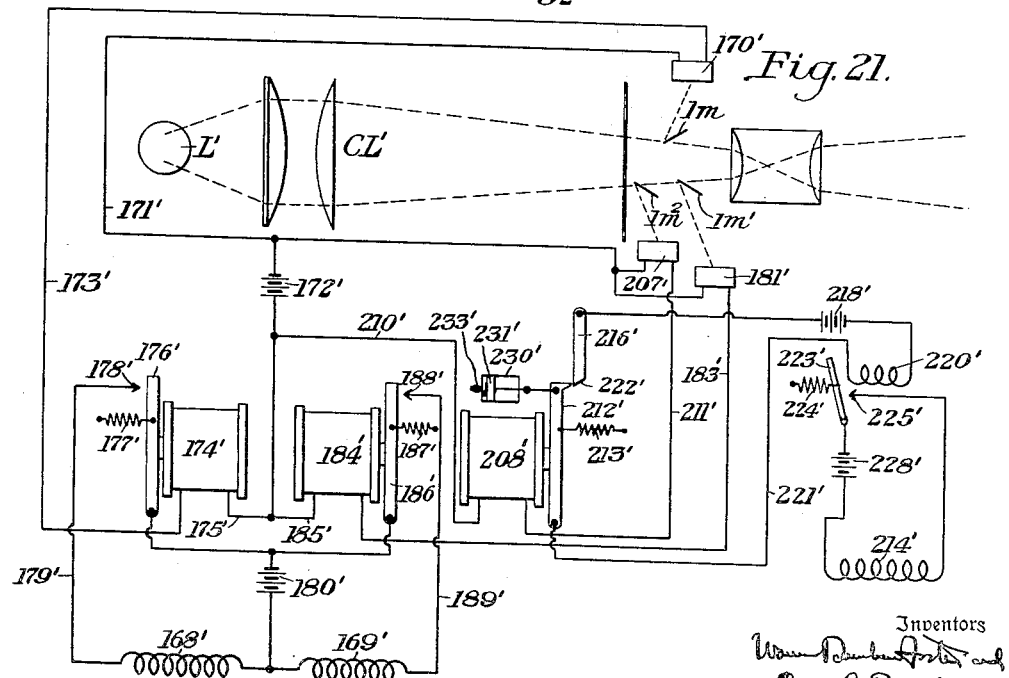

Sept. 3, 1940.  W. D. FOSTER ET AL  2,213,212
LIGHT-RESPONSIVE CONTROL MECHANISM
Original Filed April 28, 1926   13 Sheets-Sheet 11

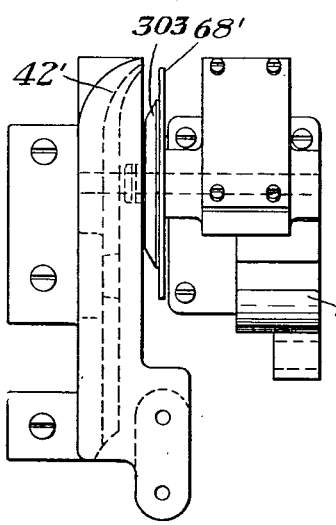
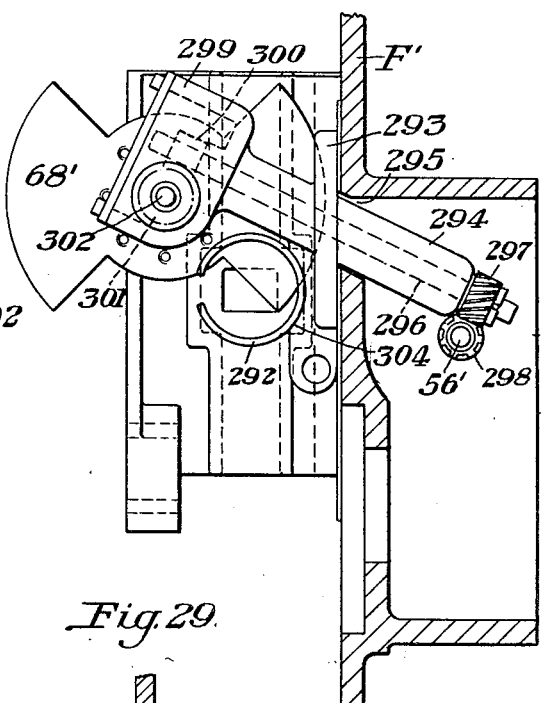
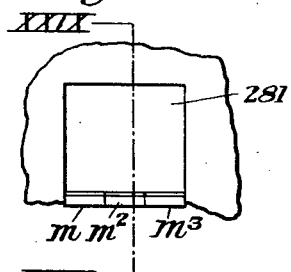
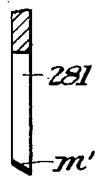
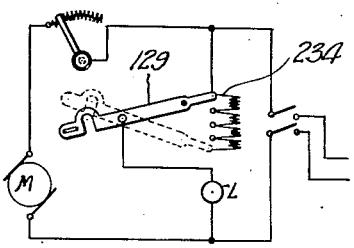
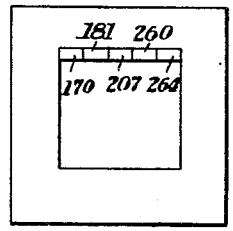

Sept. 3, 1940.   W. D. FOSTER ET AL   2,213,212
LIGHT-RESPONSIVE CONTROL MECHANISM
Original Filed April 28, 1926    13 Sheets-Sheet 13

Patented Sept. 3, 1940

2,213,212

UNITED STATES PATENT OFFICE 2,213,212

LIGHT-RESPONSIVE CONTROL MECHANISM

Warren Dunham Foster, Washington Township, Bergen County, N. J., and Earle L. Parmelee, deceased, late of Pittsburgh, Pa., by Peoples-Pittsburgh Trust Company, executor, Pittsburgh, Pa., assignors, by direct and mesne assignments, to Kinatome Patents Corporation, Ridgewood, N. J., a corporation of New York Original application April 28, 1926, Serial No. 105,159. Divided and this application January 12, 1934, Serial No. 706,437

52 Claims. (Cl. 88—17)

The present invention is a division from our copending application, Serial Number 105,159, filed April 28, 1926, which matured on January 16, 1934 as United States Patent Number 1,944,024.

In our parent application, we illustrate our invention as applied to a film handling apparatus, but it will be understood that it can be applied to any apparatus in which web, strip or band material is fed, different portions of such material having different light transmitting or light reflecting characteristics.

In our parent application we disclose and claim film handling apparatus all of the operable parts of which, and, if desired, those of an associated apparatus, are controlled by means which are responsive to light from the film or workpiece. Such operable parts include among others a continuously operating motor, continuously operating delivery and taking-up members, means for intermittently advancing the film from the delivery member to the taking-up member, means for properly positioning the film in relation to the intermittent advancing means, means for compensating for the difference in character of movement of the continuously operating delivery and taking-up members, and the intermittent advancing means, means for re-winding the film, and means for stopping the film predeterminedly as for showing still pictures. Apparatus as described and claimed in our parent application includes light-responsive automatic control means for carrying out each and/or all of the threading and subsequent operations which may be performed upon the film or other strip material. Our parent application also discloses means for reducing the speed of the motor and the amount of the light reaching the film in appropriate relation to each of the operations which is about to be performed or is being performed upon the material. Concomitantly with the operation of each of the parts necessary for the automatic control of the threading and subsequent operations of the principal apparatus we show and claim in our parent application means for operating an associated apparatus such as a sound reproducing means, advertising sign, radio device, or the like.

In our parent application we broadly claim means for reducing the motor speed and the light intensity and also specifically claim means for placing extra resistance in the motor circuit and a heat shield for reducing the light. In the present application we claim the use of other specific means for slowing down the motor and for reducing the light, these specific means being particularly useful in connection with changes in operating conditions as stated above. The specific devices of this character which we claim herein are a brake for the motor and means for placing resistance in the circuit of the light source. We claim each and both of these devices in combination with the various operable elements of the main and associated machines and also independently thereof in certain aspects.

In our parent application we claim in various combinations broadly the reduction of the speed of the driving mechanism and specifically the introduction of resistance into the motor circuit. In the present application we claim specifically the application of braking means to said driving mechanism. Therefore it should be understood that the interpretation of "brake" or "braking means" in the claims herein should not be taken to include the introduction of resistance into the motor circuit, claims to that species of our invention having been made in our parent application.

In this and in our parent applications this invention is illustrated as applied to a fully developed automatic film handling apparatus in which all of the operable parts are controlled by light from the film. It is to be definitely understood, however, that the invention is also applicable to less fully developed apparatus in which only a portion of the above described operable parts are automatically controlled by light-responsive means.

A principal object of the present invention is to provide improved means for controlling the speed of operation of a material handling apparatus in appropriate relation to the operation to be performed upon or by the material handled thereby. A related and important object is to provide improved means for controlling the light reaching a film in appropriate relation to such operation. A further object is to carry out the two previously recited objects by means responsive to light transmitted through or by the material or film.

An object of the present invention is to provide a braking device for a power driven apparatus which can be effectively operated by one means concomitantly with the operation of a control mechanism for the apparatus by other means.

Another object of the present invention is to provide a connection between control mechanism for a machine and a braking device which brings about the operation of the braking device upon initial operative movement of the control mechanism.

Another object of the present invention is to provide means for securing the application of a braking device to a motor drivingly connected to an apparatus for a predetermined period during the operation of a control mechanism for the apparatus and for releasing said braking device automatically concomitantly with the completion of operation of the control mechanism.

Another object of the present invention is to provide in a film handling apparatus which includes an electric light source, means responsive to light from said source passed through or by a film for varying resistance in the circuit of the electric light and thereby changing the intensity of the light itself.

Another object of the invention is to provide a braking device for an electric motor driven apparatus which can be effectively operated by electro-magnetic means concomitantly with the operation of a control mechanism by other electric means for controlling changes in work conditions of the apparatus.

Another object of our invention is to provide for use with a power driven machine operating on a work-piece, control mechanism actuable by light directed from a source on one side of the work-piece across the work path thereof to a light responsive element on the opposite side of the work-piece.

It will be readily understood as the description proceeds that the present invention may be practised on widely varying types of apparatus. The drawings forming a part of the present application show, for illustrative purposes only, part of the apparatus disclosed in our parent application.

Other advantages and characteristics of the invention will appear as the description proceeds and from the attached drawings and the subjoined claims. Although we are showing only one embodiment of our invention as a whole it will be understood that we are not limited to this particular construction as changes herein may be readily made, without departing from the spirit of our invention and the scope of our broader claims.

In the drawings:

Figure 4 is a partial left side elevation broken away to show actuating parts in film threading position;

Figure 5 is a cross section on the line V—V of Figure 2 looking in the direction of the arrows;

Figure 6 is a partial view taken on the line VI—VI of Figure 1 showing the right side only to illustrate a portion of the gate;

Figure 9 is a partial bottom plan view showing actuating levers in "film threading or changing" position;

Figure 10 is a partial bottom plan view showing actuating levers in "rewind" position;

Figure 13 is a view similar to Figure 12, illustrating a similar control operable in the event of breakage of the film;

Figure 14 is a diagrammatic view illustrating a form of control effective for signaling or actually effecting the initiation or cessation of an incidental operation;

Figure 15 is a detail view on an enlarged scale of a portion of a film, illustrating one manner in which any of the controls herein referred to may be obtained, such control being effected by specially treating the film in the space usually provided between adjacent pictures;

Figure 16 is a view similar to Figure 15, showing the manner of obtaining similar results by a special edge marking of the film;

Figure 17 is a view similar to Figures 15 and 16, illustrating still another form of film marking operative in accordance with the present invention;

Figures 18, 19 and 20 are views similar to Figures 14, 15 and 16, respectively, but illustrating exactly the reverse of the conditions therein shown;

Figure 11:
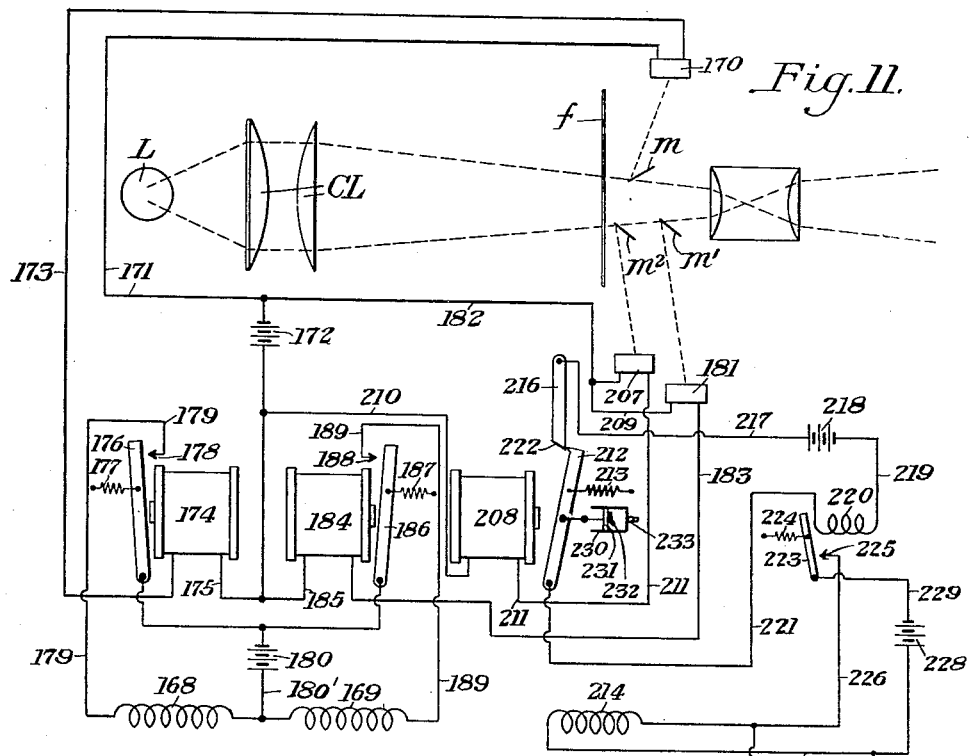
Figure 11 is a diagrammatic view illustrating one form of controlling circuit which may be utilized in accordance with the present invention.
Figure 22:
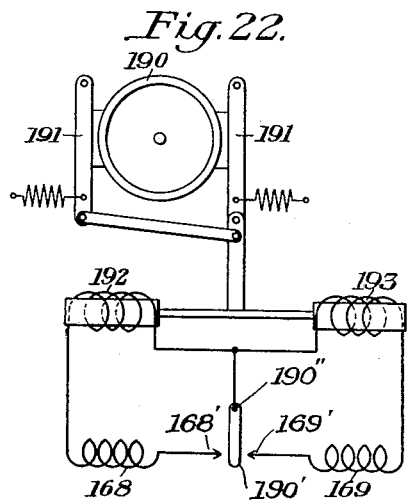
Figure 23:
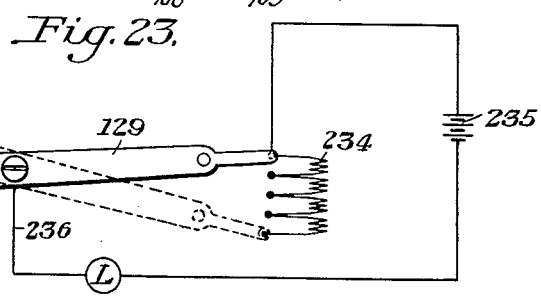
Figure 25:
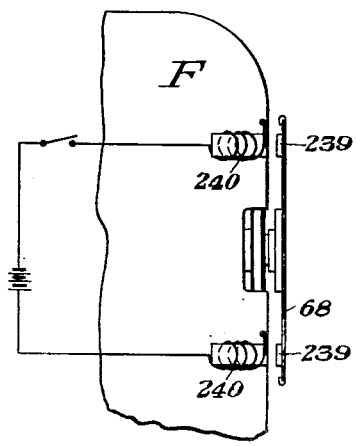
Figure 24:
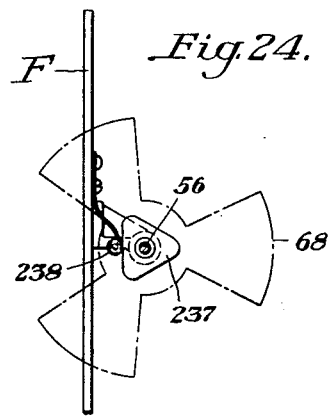
Figure 31:
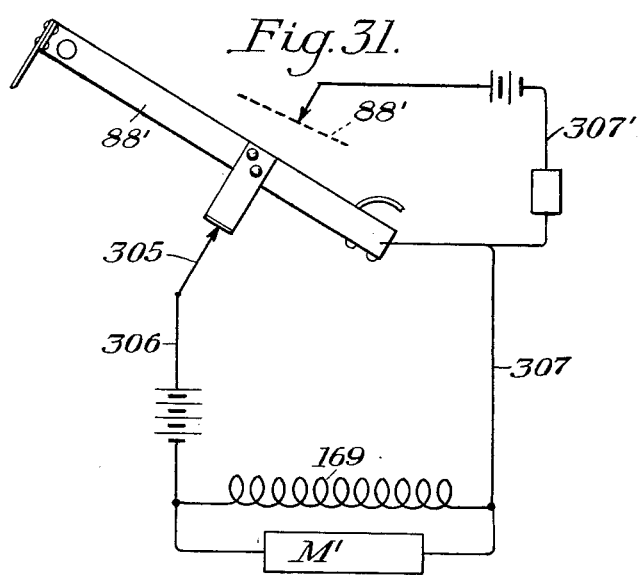
Figure 32:
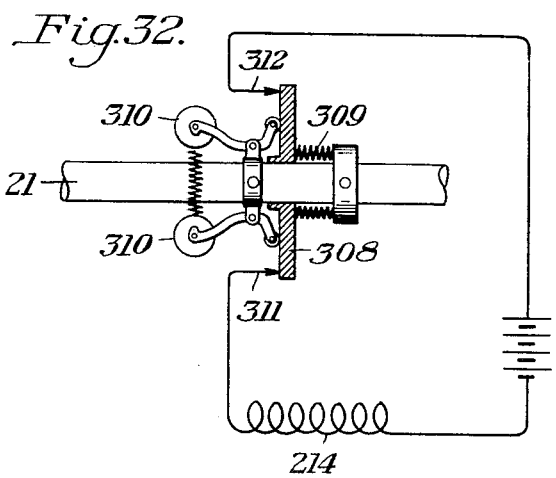

Figure 20' illustrates still another type of film;

Figure 21 illustrates diagrammatically a form of controlling circuit similar to that of Figure 11, but in which the light sensitive elements are normally subjected to light;

Figure 22 is a diagrammatic view illustrating one form of control in which the speed of the feeding mechanism is automatically reduced by means of a brake;

Figure 23 is a view, largely diagrammatic, showing means for varying effective light intensity without the use of a heat shield;

Figures 24 and 25 are diagrammatic views illustrating different forms of mechanisms for insuring the shutter stopping in the desired position for still projection; Figure 24 illustrating a mechanical control and Figure 25 a magnetic control;

Figures 26 and 27 are detail elevational and sectional views respectively of a modified form of shutter positioning;

Figure 28 is a partial front elevational view of a gate showing one form of window or aperture;

Figure 29 is a vertical sectional view on the line XXIX—XXIX of Figure 28;

Figure 30 is a view similar to Figure 28, illustrating a modified form of aperture;

Figure 31 is a diagrammatic view illustrating a modified embodiment of the present invention illustrating one means of control operating under predetermined tension conditions in the film;

Figure 32 is a detail view, largely diagrammatic, illustrating means whereby cessation of operation of the driving motor may be utilized to control certain circuits or produce predetermined results.

Figure 34:
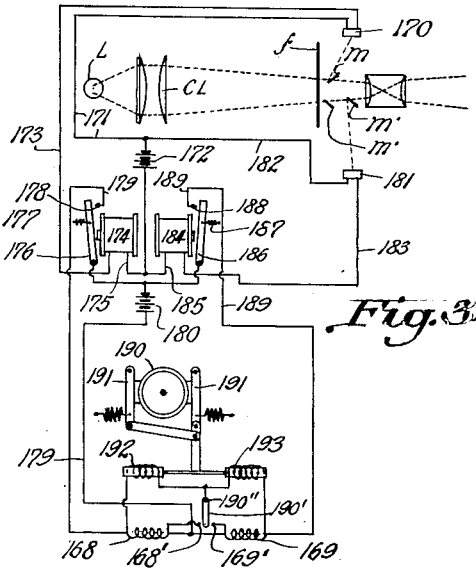

Figure 33 is a wiring diagram of the motor and light circuits of the apparatus; and Figure 34 is a combination of Figures 11 and 22.

In carrying out the present invention there may be provided an apparatus comprising a supporting base B having mounted thereon a lamp and resistance containing housing H and a supporting frame F upon which are mounted the operating parts of the film feeding and controlling mechanism per se.

Preferably carried by the frame F and projecting laterally from one side thereof in predetermined spaced relationship is a pair of reel receiving spindles 2 and 3, the upper spindle 2 being adapted for the holding of a reel of film during the feeding movement thereof and adapted to effect rewinding of the film at the conclusion of the feeding movement, while the lower spindle 3 is adapted to be positively driven simultaneously with the feeding movement for coiling or taking up the film as required.

The film itself is preferably carried in a combined storage and exhibiting protector comprising a pair of containers 4 and 5 having a pivotal connection 6 whereby the containers may be relatively separated to a predetermined extent to expose the desired length of film therebetween. Lug members 4' and 5' are secured to the frame and help hold the containers 4 and 5, respectively in operative position in the apparatus. This construction may be substantially as disclosed and claimed in the United States Patent No. 1,440,173, granted December 26, 1922 to Herbert George Ponting and George William Ford, or may be of any other desired construction. If desired, conventional open reels may be employed.

The lower spindle 3, which will hereafter be referred to as the driving spindle, is journaled for rotation in a suitable bearing 7 in the frame F. The back of the frame is formed with an enlarged boss 7ᵃ through which the spindle extends, and beyond the boss there is secured to the spindle a combined brake drum 8 and friction driving member 9. The driving member 9 has a friction surface 10 with which is adapted to cooperate a second friction member 11 in the form of a disk. The disk 11 and the driving member 9 are preferably held in frictional engagement by means of springs 12 carried by the member 9 and bearing against the disk 11 through the medium of an annulus 13, the springs being held under the desired tension and the annulus being maintained in position by adjusting screws 14.

Projecting rearwardly from the disk 11 is a driving lug 15 adapted to be engaged by a clutch hereinafter described in detail by means of which the driving spindle 3 may be frictionally rotated.

Projecting upwardly from the base B in spaced relation to the frame F is a bearing bracket 16 carrying a bearing 17 for a shaft 18 extending in alignment with the driving spindle 3. Secured in any desired manner to the shaft 18 for rotation therewith is a worm wheel 19 adapted to be driven by a worm 20 secured to a horizontally positioned driving shaft 21 located in the rear of frame F. This shaft at its forward end is mounted in spaced bearings 22 carried by the bracket 16 and is connected to a driving motor M through a flexible coupling 23 of any desired or usual construction. By reason of this mechanism, it will be apparent that when the motor M is operated the shaft 18 will be positively driven through the worm and wheel before referred to. For transmitting this rotational movement from the shaft 18 to the spindle 3 at will there is provided a sleeve 24 secured in any desired manner to the inner end of the shaft 18 and having slidably mounted thereon a collar 25 from which project pins 26 slidable through the enlarged end 27 of the sleeve 24. By moving the collar 25 to the right as viewed in Figure 5, the pins 26 are projected into the path of travel of the driving lug 15 whereby a drive is positively transmitted to the driving spindle. This clutch will hereinafter be referred to as the driving spindle clutch.

The spindle 2, which will hereinafter be designated the rewinding spindle, is mounted similarly to the driving spindle 3 in a bearing 28 carried by the frame F, and has secured to its rear end a brake drum 29 from which projects a pin or lug 30. Extending in alignment with the rewinding spindle 2 is a shaft 31 suitably journaled in a bearing 32 carried by a bracket 33 illustrated as secured to the frame F. Mounted on the inner end of the shaft 31 is a sleeve 34 having an enlarged end 34' through which project pins 35 carried by a collar 36 and constituting a rewinding clutch similar in construction and operation to the construction of the driving spindle clutch. Upon movement of the collar 36 to the right as viewed in Figure 5, the pins 35 will be brought into the path of travel of the pin or lug 30 whereby the rewinding spindle 2 may be operated for effecting a rewinding of a previously displayed length of film.

For driving the shaft 31, it may conveniently have secured thereto a pulley 37 in line with a similar pulley 38 mounted on the outer end of a stub shaft 39 secured in the bracket 16. Also mounted on the shaft 39 is a spur gear 40 adapted to be driven by a similar, but preferably larger gear 41 on the outer end of the shaft 18. By passing a suitable belt around the pulleys 37 and 38 it will be apparent that the shafts 18 and 31 may be simultaneously rotated by the motor M, the shaft 31 preferably rotating at a higher speed than the shaft 18, and that rotative movement in turn may be imparted by either of these shafts to the respective spindles with which they are in alignment by suitable operation of the controlling clutches.

Mounted on the frame F adjacent the motor M and preferably on the front side of the frame is a gate section 42 preferably secured in any desired manner as by screws 43 against movement relatively to the frame. This section is preferably formed with an aperture 44 through which light may be projected as well understood in the art, and with a film guiding depression 45 extending lengthwise of the section, and intersecting the opening 44, for the travel of the film. Cooperating with the section 42 is a relatively movable section 46 preferably guided by a pin 47 projecting outwardly from the section 42, and secured to one end of a gate opening rod 48 slidable through a suitable opening in the gate section 42 and a suitable bearing 49 on the frame F. By reason of this construction, it will be apparent that when the rod 48 is moved to the left as viewed in Figure 1, it will be effective for moving the section 46 away from the section 42 to permit the removal of a film and the insertion of a new film, while movement in the opposite direction will bring the sections into cooperative relationship.

For effecting the desired intermittent feeding motion of a film in position in the gate, there may be provided a rotatable feeding sprocket 50 having film engaging teeth 51 positioned to engage apertures 52 positioned in the film f, in any desired manner. This sprocket is mounted on a shaft 53 extending transversely through the frame F and carrying at its opposite end a star wheel 54. This star wheel, which may be of any well known construction, is adapted to be intermittently driven by means of a cam 55 secured adjacent one end of a shutter shaft 56 journaled at one end in a grease casing C within which are mounted the cam 55 and star wheel 54, and at its opposite end journaled in a suitable bearing 57 carried by a bracket 58 projecting rearwardly from the frame F.

Mounted loosely on the shaft 56 adjacent the opposite end thereof is a pulley 59 adapted to be rendered operative at will by a clutch collar 62. The clutch collar is normally urged in such direction as to be in frictional driving engagement with the pulley 59 by means of a spring 63 abutting at one end against the bottom of a spring receiving recess formed in the collar and at the other end against a shoulder 64 on a spring sleeve 66 secured in any desired manner to the shaft 56 for rotation therewith. Secured to the shaft 56 outside of the pulley 59 is a hub 67 carrying a shutter 68 for operation as well understood in the art. The hub 67 and the shoulder 64 take all of the thrust exerted by the spring 63 whereby the shaft 56 as a whole is relieved from any end thrust.

Secured to the end of the driving shaft 21, and preferably substantially in line with the pulley 59 is a pulley 69 around which may pass a belt 70 for driving the pulley 59 from the drive shaft. By reason of this construction, it will be apparent that with the friction surfaces 60 and 61 in engagement rotation will be imparted to the shutter shaft 56 from the driving shaft 21, this rotation being effective not only for operating the shutter but also for obtaining the desired intermittent operation of the film feeding sprocket.

Figure 1:
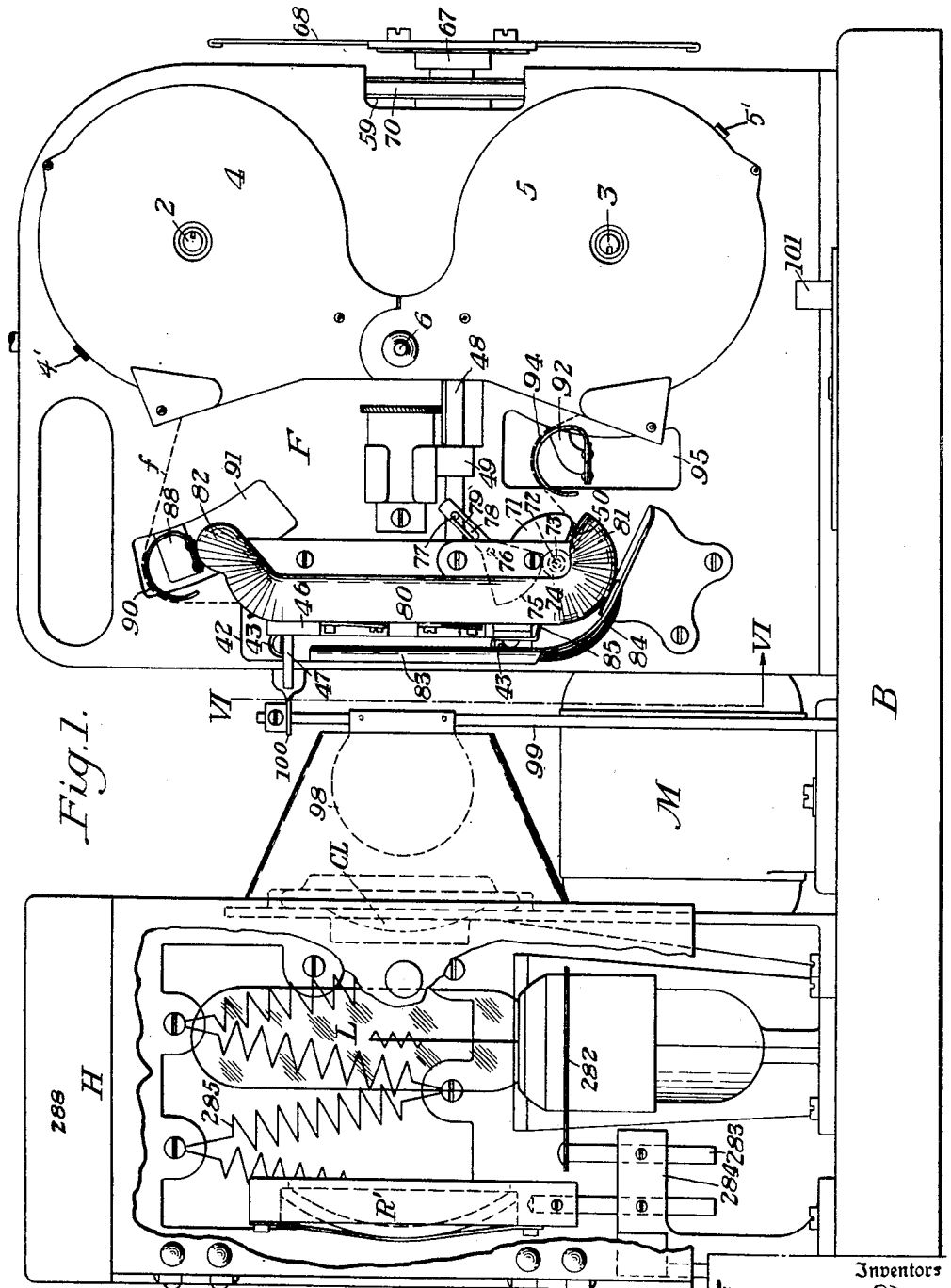
Figure 1 is a right side elevation of the machine, certain parts of the lamp housing being broken away.
Figure 2:
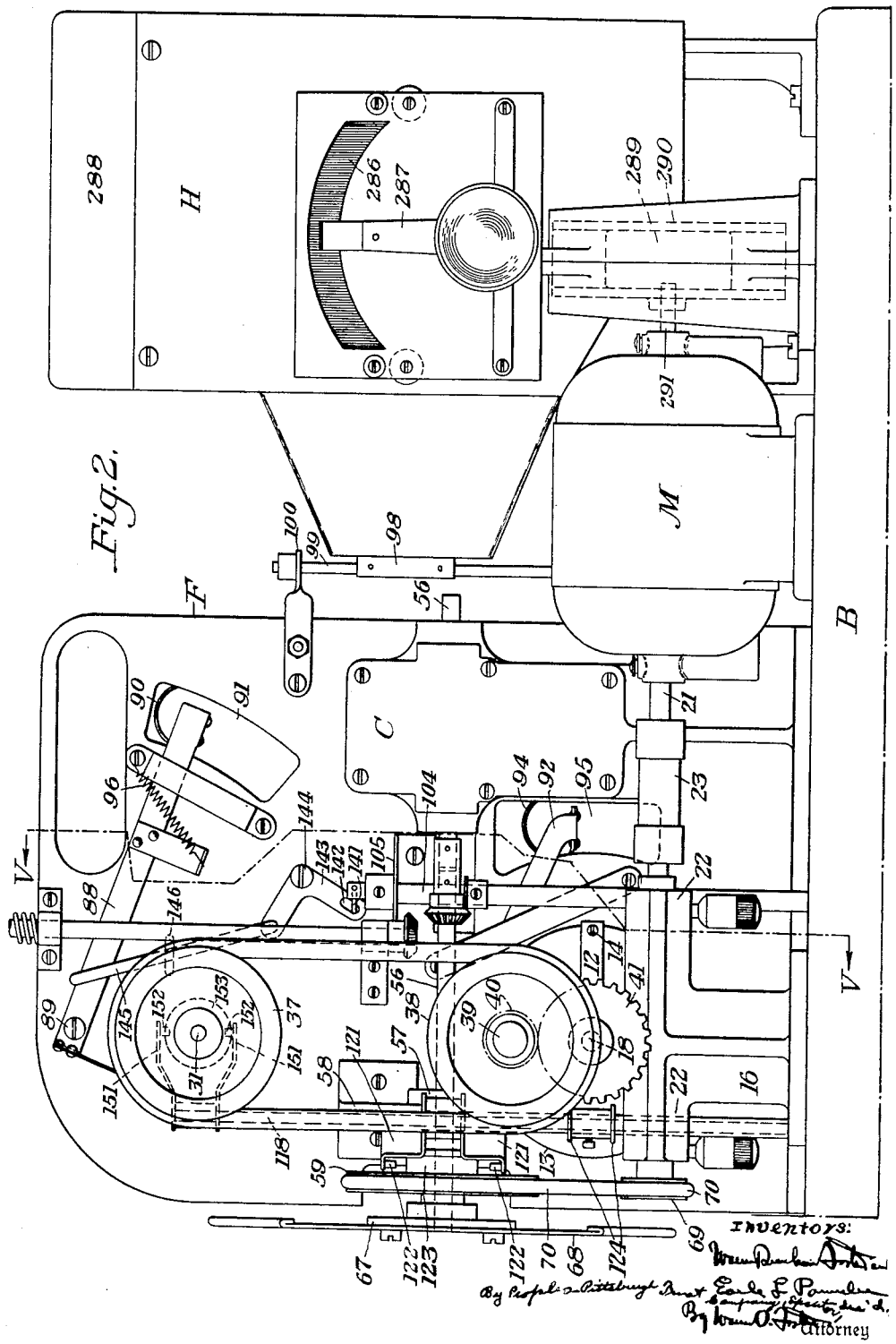
Figure 2 is a left side elevation of the machine.

Cooperating with the sprocket 50 and normally occupying the position illustrated in Figure 1 of the drawings, is a stripping and protecting shield 71 carried by the inner end of a pin 72 supported in a suitable manner by a bearing 73 constituting part of the fixed gate section 42. Also secured to the shaft 72 is a pinion 74 with which meshes an arcuate rack 75 having a pivotal mounting 76 and operated simultaneously with the operation of the gate rod 48 by means of a pin 77 projecting outwardly from the gate opening rod and engaging a slot 78 in an extension 79 of the arcuate rack. With the construction just described, movement of the gate opening rod to the left as viewed in Figure 1 for the purpose of opening the relatively separable gate sections, will effect rotation of the rack in a counterclockwise direction as viewed in the figure, thereby rotating the shield in a clockwise direction. This rotational movement of the shield will be effective for engaging the film f and stripping the same from the sprocket preparatory to the removal of the film from the apparatus. It will remain in this position covering certain of the teeth of the sprocket during the application of a new film or during rewinding, whereby the threading operation of the film is greatly expedited or the film protected during rewinding.

For further assisting the threading movement, the relatively fixed gate section 42 is provided with a projecting guide 80 having a generally curved contour for gradually feeding the film over the fixed gate section, the guide having a downwardly curved and inclined lower end 81 for insuring passage of the film over the sprocket and an upwardly inclined and curved upper end 82 for the purpose hereinafter more fully set forth. The frame F also has secured thereto a secondary guide member 83 positioned in spaced relation to the guiding member 80 and adapted to extend substantially in alignment with the inner face of the movable gate section when it has been moved to open position, whereby the film is effectively guided into position between these gate sections. The member 83 has a curved lower end 84 having a function corresponding to that of the curved end 82 of the guide member 80, and described in detail hereinafter. Projecting downwardly from the lower end of the movable gate section is a pair of spaced guide fingers 85 curved generally to conform to the curvature of the sprocket 50, the space between these fingers being sufficient to accommodate the teeth 51 of the sprocket. These guides cooperate in a manner, as will be readily apparent from the drawings, to permit a film to be positioned between the gate members by merely moving the same laterally relative to its normal direction to travel through the gate. This greatly lessens the time required for threading new film into position, and enables the operation to be performed satisfactorily by an unskilled operator.

In order to entirely obviate the necessity of manually producing slack or loops as heretofore required, there is provided a tension control means of the general character set forth in the application before referred to and in Bundick and Proctor application Serial No. 44,482, filed July 18, 1925, now Patent Number 1,944,022. This tension control preferably comprises braking means automatically operated by the film, and comprising an upper brake 86 cooperating with the brake drum 29 on the rewinding spindle 2 and a lower brake 87 cooperating with the brake drum 8 on the driving spindle 3. The upper brake 86 is carried by a brake lever 88 having a pivotal mounting 89 on the frame F at the rear thereof and having secured to its opposite end a film guide 90 projecting forwardly through a suitable opening 91 in the frame F. The lower brake 87 is in turn preferably carried by a curved lever 92 secured to a plate 93 loosely surrounding the boss 7ᵃ on the frame F whereby the plate as a unit may be rotated around this boss. At its opposite end the curved lever 92 is provided with a film guide 94 projecting forwardly through a suitable opening 95 in the frame F. During the feeding of a film through the apparatus all of the parts occupy the position illustrated in Figure 1 while during the threading of a film into position or the removal of the film from the apparatus, the parts occupy the position illustrated in Figure 3. In this latter position it will be noted that the guide 94 occupies such a position with respect to the curved lower end 84 of the guide member 83 as to insure the passage of a film upwardly around the guide 94 automatically upon lateral movement of the film, while the guide 90 occupies such a position with respect to the upwardly inclined curved upper end 82 of the guide member 80 as to insure passage of a film over and around the guide 90 by the operation referred to. The lever 88 is normally swung in such direction as to cause the brake 86 to contact with the drum 29 by means of a spring 96. Due to the action of this spring, the brake 86 normally tends to prevent too free rotation of the rewinding shaft and thereby prevents the formation of an undue amount of slack. In the event, however, of not sufficient slack, the tension on the film causes the lever 88 to move in opposition to the action of the spring 96, thereby relieving the braking action of the brake 86 to a corresponding extent and again producing the desired amount of operating slack or loop with a resultant desired tension on the film.

The lower brake 87, on the other hand, is normally so positioned as to exert no appreciable braking action on the drum 8. In the event, however, of undue tension on the film between the feeding sprocket 50 and the reel carried by the driving spindle 3, the film will be effective for swinging the lever 92 in such direction about its pivotal mounting 97 on the plate 93 as to bring the brake 87 into more effective braking engagement with the drum 8. Due to the fact that the spindle 3 is driven from the motor through a friction drive, this braking action will be effective for decreasing the driving force on the spindle 3, and consequently will relieve the tension on the film and produce the desired operating conditions between the sprocket and the lower reel. In this manner the required tension on the film to insure proper feeding is automatically produced by the mere threading of the film into position and is automatically maintained by the operation of the tension or braking mechanism. It will be understood by those skilled in the art that if desired compensation for the difference in character of movement of the continuously operating delivery and taking up members and the intermittently operating member therebetween may be secured by means of the conventional continuously operating sprockets with their unsupported loops of slack film.

In order to make it unnecessary to utilize any considerable portion of the film for titles or legends, which are obviously adapted for so-called still projection, the apparatus is adapted periodically to occupy a position in which this still projection can be obtained. Preferably, the film, by means of the light transmitted thereby, will be effective for automatically controlling the change in operating conditions of the apparatus to effect projection in motion, or still projection, the interval of time devoted to the actual still projection being entirely automatically produced, preferably by the film and light responsive mechanism controlled thereby.

When the apparatus is utilized for this so-called "still" projection of pictures, titles or legends, or during the threading or rewinding of the film, it is necessary to provide means in the path of travel of the light rays for protecting the film against danger of injury by reason of undue temperature conditions. For effectively shielding the film during such period, there is provided a trap or shield 98 carried by a shaft 99 having its upper end journaled in a bearing 100 projecting from the frame F and having its lower end suitably journaled in the supporting base B. This shaft is adapted to be periodically and intermittently operated in accordance with the character of operation of the machine for bringing the shield positively into position when the apparatus is operating for the still projection of pictures and to throw it out of position for the projection of pictures in motion.

While the present apparatus is not necessarily limited to any particular field of use, it is especially intended either for use in advertising for the successive showing of a length of film or for use by persons who may be unskilled in the art. With this dual purpose in view, it is desirable not only to provide for automatic control, but also to simplify the control to as great an extent as possible not only for the purpose of rendering the operation easier, but for the purpose of reducing the chances of error in such an operation. For this purpose there is preferably provided a single control member in the form of a knob or button 101 projecting upwardly through an arcuate slot 102 in the supporting base B. This slot may be so shaped as to provide four operating stations designated, respectively, S1, S2, S3 and S4. The button 101 is adapted to be moved at will either manually so as to occupy any one of these stations, or automatically so as to occupy any of stations S1, S2 or S4. With this button at the station S1, the respective parts of the apparatus are in such position as to insure the normal projection of pictures as usual motion pictures. With the control button at station S2, there is obtained a so-called still or stereoptican projection, the movement of the button from the station S1 to the station S2 being effective for disengaging the respective driving mechanisms which are in operation during the projection of pictures in motion. With the button in position at station S3, the respective parts of the apparatus are in such position as to permit the positioning of a film therein or the removal of a film which has just been fed therethrough. It will be understood that the movement of the button from station S2 to station S3 automatically produces the required change in the operating position of the parts. With the button in position at station S4, the respective parts of the apparatus are in such position as to permit rewinding of the film by means of the motor M. The movement of the button from station S3 to station S4 automatically produces the required change in operating conditions necessary for such rewinding. This provision of a single control member movable only in a predetermined manner and automatically effective upon movement for producing all of the necessary changes in operating conditions constitutes an important feature of the present invention, as it renders the control and operation of the apparatus extremely simple and substantially without likelihood of error.

The control mechanism actuated either manually by the control knob or automatically as hereinafter set forth in detail, is to a large extent shown in Figures 7, 8, 9 and 10, inclusive, and diagrammatically in Figure 11, which illustrate in succession the change in the position of the parts of the control mechanism by movement of the control button successively to the respective stations, and the circuits by means of which the desired movements are produced. This mechanism may comprise a lever 103 keyed or otherwise secured to the lower end of a brake release rod 104 having its lower end journaled in any desired manner in the base B and its upper end journaled in a bearing bracket 105. Being secured to the brake release rod 104 which is capable only of a turning movement about its longitudinal axis, the lever 103 is restricted in its movements to rotation only. Carried by the rotating lever 103 is a combined sliding and rotating lever 106 having adjacent each end a slot 107 through each of which projects a headed pin 108 by means of which the combined sliding and rotating lever is effectively mounted on the rotating lever for rotational movement simultaneously therewith and sliding movement independently thereof. At its front end the lever 106 carries an upstanding pin 109 having a head 110 provided with an inwardly projecting pin 110' adapted to engage a bayonet shaped slot 111 in the pin 109. By reason of this construction it will be apparent that the button may be moved vertically on the pin 109 by a rotative movement thereof so that it may either occupy an upper or a lower position on the pin. At its lower end the button has a collar 113 of a diameter substantially to conform to the contour of the slot 102 at the respective operating stations, whereby with the button in its lower position accidental movement from one of these stations is prevented, while with the button in its upper position the parts are free for automatic operation independently of any operator.

At a point intermediate its length the combined rotating and sliding lever 106 is provided with a transversely extending recess 114 adapted to cooperate with a pin 115 projecting from a lever 116 which is secured adjacent one end on a control sleeve 117 surrounding a control rod 118, the sleeve and rod extending upwardly through the base B and journaled for rotational movement in bearings carried by the bracket 16 and by an upper bearing 120 carried by the bracket 33. Adjacent its upper end the control sleeve 117 has projecting therefrom forked operating arms 121 carrying projecting pins 122 adapted normally to lie in the groove 123 of the clutch member 62 on the shutter shaft 56. By reason of this construction it will be apparent that upon rotation of the sleeve 117 in a counter-clockwise direction, as viewed in Figure 7, the clutch members 60 and 61 will be disengaged, thereby destroying the driving relationship between the main drive shaft 21 and the shutter shaft 56.

At an intermediate point the control sleeve is also provided with a similar pair of arms 124 having pins 125 normally projecting into the groove 126 of the clutch collar 25. Rotation of the sleeve in a counter-clockwise direction as just described will be effective through the arms 124 for disengaging the driving spindle clutch thereby to permit the driving spindle to move freely in either direction. Engagement of the driving spindle clutch and the shutter shaft clutch will be effective for the so-called projection of pictures in motion but this engagement is not required for still or stereopticon results. This operation of the sleeve 117 is obtained by moving the control button from station S1 to station S2, or from the position shown in Figure 7 to the position shown in Figure 8, by reason of the relative movement imparted to the sleeve due to the sliding action of the lever 106.

Pivotally mounted adjacent the side of the combined sliding and swinging lever structure is a friction and positive detent 127. One end of this detent has connected thereto one end of a tension spring 128, the opposite end of which is secured to a suitable projection on the base B of the apparatus. The spring normally tends to swing the detent in a counterclockwise direction about its pivotal mounting as will be apparent from the drawings. This forces the upper end of the detent into frictional engagement with the sides of the levers 103 and 106, thereby tending to frictionally hold the levers in any position to which they may be moved.

In changing from the normal projection to the projection of still pictures, it is also necessary to move the shield or screen 98 into position. This is positively accomplished simultaneously or in timed relation with the rotation of the sleeve 117, through the medium of a lever 129, pivoted at its intermediate portion on a stud pivot 130, secured in the base B. At one end the lever 129 has a slot 131, within which projects the pin 115 on the lever 116. At its opposite end, the lever 129 is pivotally connected to a link 133, the opposite end of which is connected to a crank arm 134, secured to the lower end of the shaft 99. The opposite end of the lever 129 is curved to provide a recess, as clearly shown in the drawings, adapted to permit the desired operation of the detent 127 without interference therewith. Through the medium of the mechanism just described, the movement of the lever 106 from station S1 to station S2 will rotate the lever 129 in such direction as to swing the heat shield into light-intercepting position. It will be noted that this movement of the light shield takes place positively in timed relation to the movement of the operating parts necessary in obtaining still projection, and thereby eliminates any possibility of injury to a film from the heat of the light source while the film is stationary.

It may be assumed that after the single projection of a film, or the repeated projection thereof, it is desired to change the same, or that in starting it may be necessary to move the parts of the apparatus into such position that a film may be threaded into position therein. Under such circumstances, the control button will be moved from station S2 to station S3. This movement will be effective only for rotating the brake release rod 104 and for bringing a recess 137 in the lever 106 into cooperative engagement with a pin 138, projecting upwardly from a lever 139, secured to the lower end of the control rod 118.

Figure 7:
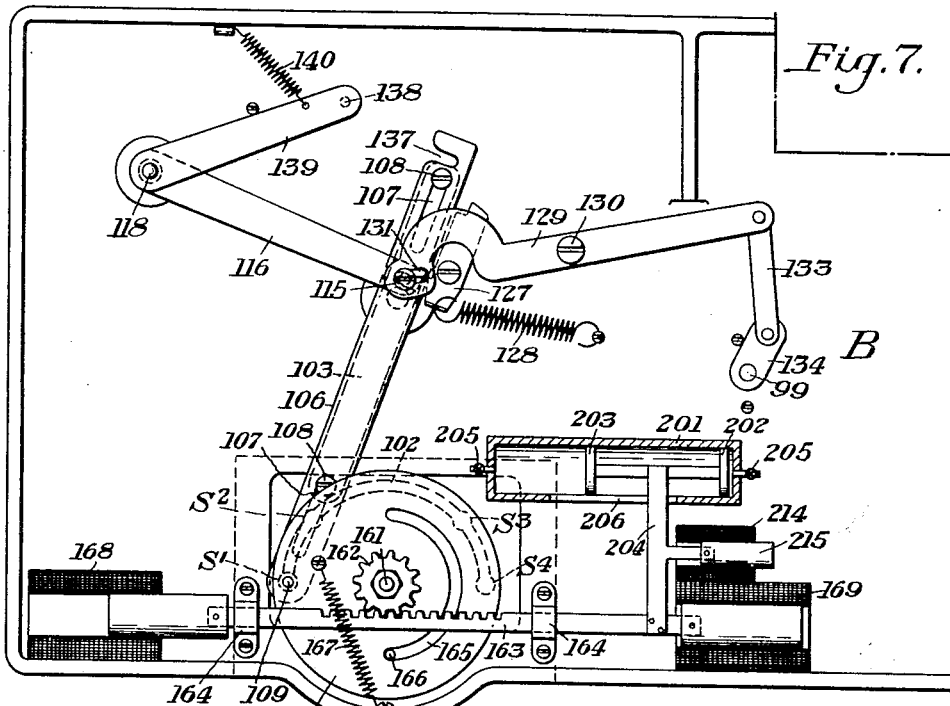
Figure 7 is a partial bottom plan view showing actuating levers "in normal intermittent projection" position.
Figure 8:
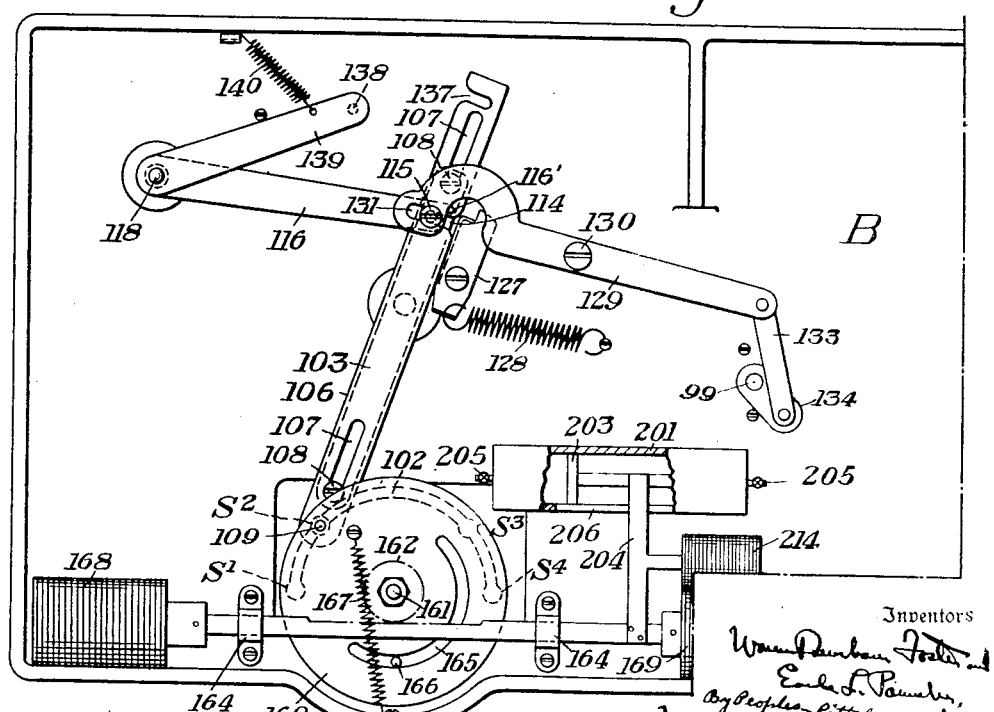
Figure 8 is a partial bottom plan view showing actuating levers in "still projection" position.

The lever 139 is normally held in the position shown in Figures 7, 8 and 9 by a tension spring 140, which may be secured in any desired manner to the base B of the apparatus. In this position, the pin 138 will be received by the slot 137 when the parts are rotated in the manner described.

At the commencement of the movement from station S2 to station S3, the combined swinging and sliding lever structure will be moved away from the detent 127, thereby permitting it to swing in a counterclockwise direction under the influence of its tension spring. This movement will be effective for bringing the notched end of the detent into engagement with the projection 116' of the end of the lever 116, whereby the lever 116 and its associated parts will be held in the proper position.

The rotation of the brake release rod is effective for opening the gate sections of the gate, for moving the tension members 86 and 87 and their associated parts to inoperative position and for so actuating the stripping and protective shield 71 as to effect the desired stripping movement of a film from the sprocket 50 or the shielding of the sprocket to permit the threading of a new film into position. These operations are obtained by securing to the upper end of the brake release rod a pin 141 extending into a slot 142 in one arm of a bellcrank lever 143, having a pivotal mounting 144 on the back of the frame F. The opposite arm of the bellcrank lever is in cooperative engagement with one end of a link 145 movable through a slide or guide 146 and having its upper end bent inwardly to extend over the brake lever 88. Movement of the control button from the station S2 to the station S3 will be effective for rotating the brake release rod 104 in a clockwise direction, as viewed in Figure 9, thereby rotating the bellcrank lever 143 in a counterclockwise direction, as viewed in Figure 4, and consequently, rotating the brake lever 88 about its pivotal mounting 89 in opposition to the spring 96 for moving the brake 86 to inoperative position.

Figure 3:
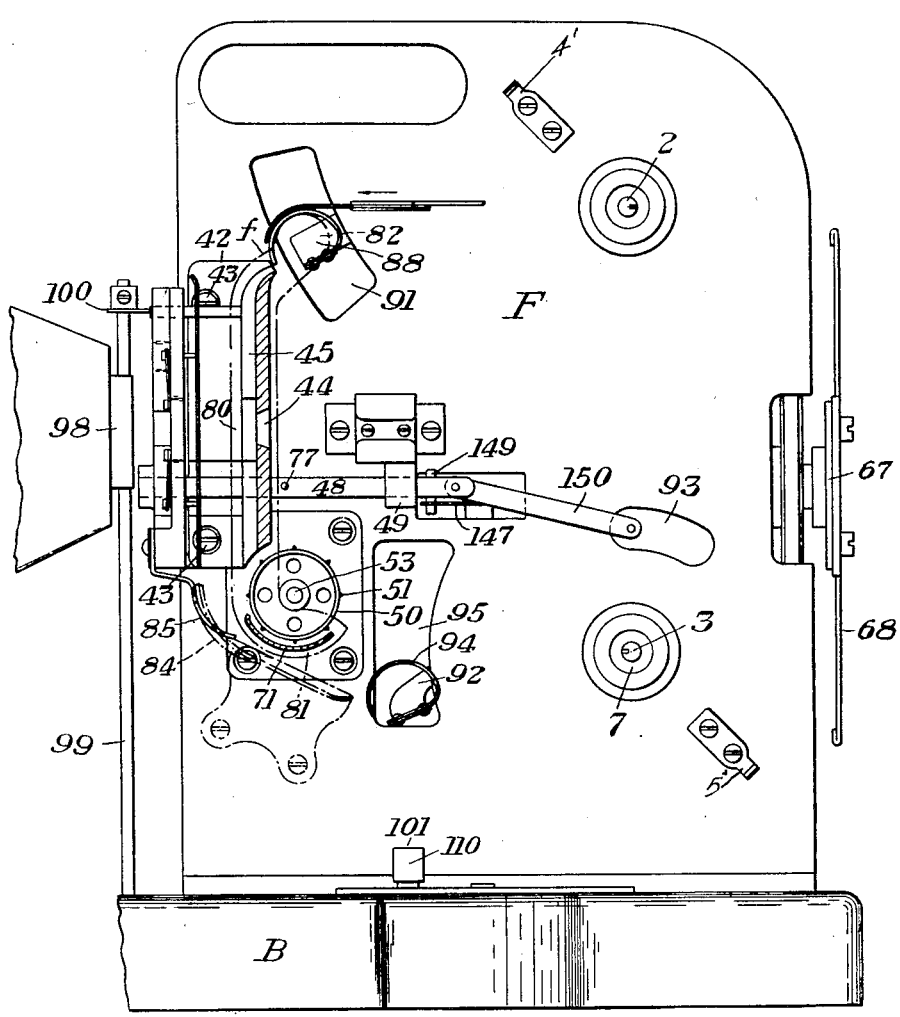
Figure 3 is a partial right side elevation broken away to show actuating parts in film threading position.

Movement of the lower tension arm is obtained simultaneously with actuation of the upper tension arm through the medium of a crank lever 147, secured at an intermediate point to the brake release rod. This crank lever has a slot 148 in its free end into which projects a downwardly extending pin 149 carried by the gate control rod 48. The right hand end of the gate control rod as viewed in Figure 3, is connected by a link 150 with the brake lever 92, whereby said brake lever and the gate control rod operate in unison. Movement of the brake release rod occasioned by operation of the control button from station S2 to station S3 is effective for rotating the parts 93 and all parts carried thereby in such direction as to lower the film guide 94 in the slot 95 and bring it into such cooperative relation to the guides 60 and 83 as shown in Figure 3, as to facilitate the removal of a film or the positioning of another film. This movement of the gate control rod will also tend to separate the gate sections and will move the shield 71 into stripping and shielding position, as will be obvious.

If it is not desired to change a film, as would be the case in advertising for example, the control button may be moved from station S3 to station S4, or may be moved from station S2 to station S4 without stopping at station S3. This movement will be effective by reason of the engagement between the recess 137 and the pin 138 for rotating the control rod 118. At its upper end, this control rod carries spaced arms 151, similar to the arms 121 and 124, previously described, and provided with pins 152, normally lying in the groove 153, in the rewinding clutch collar 36. The rotation of the control rod 118, as occasioned by the movement of the control button from station S3 to station S4, will be such as to move the rewinding clutch into operative position, whereby the spindle 2 is connected in driving engagement with the shaft 31, this engagement being such that the film may be rewound by the continued operation of the motor M.

During this time, the spring 140 will be held under tension in such manner that should an operator fail completely to position the button at the station S4, the spring will be effective for automatically restoring the parts to an inoperative position at station S3.

From the foregoing, it will be apparent that the operation of a single control button performs in succession the necessary changes in the operating positions of the various parts for permitting any desired condition of operation of the apparatus. Upon movement of the control button from station S4 to station S3, the rewinding clutch will be disengaged and the lever 139 held in position by the spring 140. Upon movement from the station S3 to the station S2, the recess 137 will leave the pin 138 and the brake release rod 104 will be rotated in the opposite direction to that heretofore described.

During this movement, the combined swinging and lever structure will come into engagement with the detent 127 and swing it in a clockwise direction against the action of its controlling spring, thereby to release the projection 116' from the holding action of the detent, and permit the lever 116 and its associated parts to be subsequently moved as required, upon movement of the control button from station S2 to station S1. Such movement of the button will swing the lever 116 in the opposite direction to that previously described, and thereby effect re-engagement of the shutter clutch and of the driving spindle clutch. At the same time, lever 129 will be restored to its original position, thereby, in turn, effecting movement of the heat shield to inoperative position.

Reference has heretofore been made to the adaptability of the apparatus to advertising or other purposes wherein repetitious showing of the film is desirable, and wherein for practical reasons, it is not feasible to have an operator in constant attendance. In such cases, the movement of the control parts may be automatically obtained merely by moving the control button 101 to its upper position on the pin 109 as before described. When in this position, there will be no holding or locking effected by the button so that all of the parts are free for automatic operation. Mechanism for this purpose is shown in Figures 7, 8, 9, 10 and 11.

As shown in Figures 7 to 10, both inclusive, one form of mechanism may comprise a disk 160 having a pivotal or rotative support 161 on the base B. This disk has secured thereto the pin 109, whereby rotation of the disk will accomplish the same movement of the control mechanism as is effected by movement of the button 101. Such rotation may be obtained by providing a pinion 162, concentric with the support 161. Cooperating with this pinion is a rack 163, preferably of rectangular or angular cross section, whereby it may be effectively held in the desired operating position by means of guides 164 on the base B. Formed in the disk 160 is an arcuate slot 165 into which extends a stop pin 166, projecting downwardly from the base of the apparatus. The length of the slot is such that it will just permit enough rotation of the disk to move the pin 109 from station S1 to station S4 or vice versa, the stop pin positively stopping the disk in desired position at these stations. Accidental movement away from these stations may be prevented by the provision of a comparatively strong tension spring 167, having one end secured to the disk and the opposite end attached to the base B, the point of attachment to the disk being such that after the disk passes a midpoint between stations S1 and S4, the spring will be effective for assisting in completing such movement, the spring being placed under gradually increasing tension until such midpoint is reached.

It will be obvious to those skilled in this art that at this time, the spring 167 will effectively overcome the action of the spring 140, whereby after the button has been moved a distance far enough to effect the desired operation of the apparatus, the spring 167 will prevent return of the parts to neutral position at station S3.

For producing movement of the rack bar 163, it may be constructed either throughout, or may have end portions, of magnetic material adapted to act as cores for the solenoids 168 and 169. As viewed in Figures 7 to 10, it will be obvious that energization of the solenoid 168 will be effective for rotating the disk 160 in a clockwise direction, while energization of the solenoid 169 will effect rotation of the disk in the opposite direction. Thus, the solenoid 168 will be effective for moving the control mechanism from station S1 to station S4 to establish rewinding conditions, while the solenoid 169 will be operative at the conclusion of rewinding to re-establish projecting conditions.

The energization of the respective solenoids at predetermined time intervals may obviously be accomplished automatically in a number of different ways.

As illustrated more particularly in Figure 11 of the drawings, this operation may be effected and controlled directly by the light transmitted by the film $f$. In this figure, the light source L is diagrammatically indicated, as is also any usual form of condensing lens CL. The light from the source passes generally as indicated by the broken lines, through the condenser lens, and thus to and through the film $f$, where the film is of the transparent type. On the opposite side of the film is arranged any desired form of objective lens, operating as well understood in the art. Positioned in any desired manner, so as to be operated upon by light transmitted through the film, where it is of the transparent type, either before the light has gone through the objective lens or after it has passed through such lens, is a mirror or other reflecting surface $m$. During normal operation of the apparatus, the film will be of such nature, in accordance with this embodiment of the invention, that no direct light rays will reach the mirror $m$. At any predetermined point, however, the film may be of such special construction as to permit the passage of light directly to this mirror. At such time, the mirror will serve to reflect such light, as indicated in broken lines, onto a light sensitive or photo-electric material 170 of any desired nature, such as a selenium cell, metallic potassium cell, or the like. Such light will have the effect of decreasing the resistance of the cell to the travel of an electric current, and this change in resistance may be utilized for controlling the operation of the solenoid 168. The light-sensitive material may be in series with an electric circuit by connecting one portion thereof by means of a wire 171 to one side of a suitable source of current 172 and by connecting the other side through a wire 173 directly to one terminal of a relay 174. The opposite terminal of the relay 174 has a connection 175 to the opposite side of the source of current 172. When the element 170 is under the influence of light, the relay 174 will be effective for moving its armature 176 in opposition to the holding action of the spring 177, and thereby bring it into engagement with the contact 178. The contact 178 is connected by means of a suitable conductor 179 to one terminal of the solenoid 168, while the armature 176 of the relay is electrically connected to the opposite side of the solenoid through a source of current 180 which is connected to solenoids 168 and 169 by lead 180'. It will thus be apparent that when the element 170 is under the influence of light, the solenoid 168 will be energized. This operation is desirable when a film has completed its travel in a normal feeding direction and is ready for rewinding. By properly marking the film, the element 170 is automatically subjected to light at the desired point in the film travel, the solenoid 168 energized and the disk 160 rotated in such direction that the parts are moved from station S1 to station S4, and the rewinding of the film accordingly accomplished.

In several of the attached claims as a matter of brevity and convenience, the expression "photo-electric cell" has been used. This phrase is to be taken to include any type of light sensitive element, whether it modifies an electric current which is delivered to it or creates an electric current directly, or whether it is actuated by relative brightness or relative darkness.

At the conclusion of the movement of the film in a rewinding direction, it is desirable automatically to stop such movement and initiate a normal feeding movement for projection purposes in the opposite direction. This may be accomplished by providing a second mirror $m'$, adapted to cooperate with a second light-sensitive element 181. Normally, the film will be so marked that the mirror $m'$ receives no direct rays of light. At the conclusion of the movement of the film in a rewinding direction, however, a predetermined marking on the film will permit the transmission of light directly to the mirror $m'$, which will, in turn, be operative for focusing it onto the element 181. This element is in series with an electric circuit, comprising a connection 182, to one side of the source of current 172, and a second connection 183 with one terminal of a relay 184. The opposite terminal of this relay has a connection 185 to the source of current 172. When the element 181 is under the influence of light, the relay 184 will be effective for moving its armature 186 in opposition to the holding spring 187 and bring it into engagement with a contact 188. This contact has a connection 189 to one side of the solenoid 169, the armature 186 of the relay being connected to the opposite side of the solenoid 169 through the source of current 180. Thus, when the film concludes its movement in a rewinding direction, the light transmitted by the film, where the film is of a transparent nature, will be effective on the element 181 for closing the circuit to the solenoid 169.

It will be apparent that during the normal travel of the film for projecting purposes the film will be in the desired position with respect to the light source and various apertures and lenses, whereby well defined rays form a definite portion or portions of the film may be effectively directed at will onto the element 170. During the rewinding process, however, the gate is open, thereby permitting the film to move out of focus with respect to the various parts referred to, although it does move within certain limits in a prescribed path of travel. At the conclusion of the rewinding operation, the tension exerted on the film by the rewinding spindle 2 tends to pull the film into substantially the same position which it occupies during normal periods of travel for projection purposes. When pulled into this position, a definite portion or portions of the film will then be effective for obtaining the desired concentration of light onto the mirror $m'$ and consequently the element 181. Inasmuch as the rewinding spindle 2 is frictionally driven, the film is automatically pulled into the desired position and retained therein, without injury to the film, until the light concentrated onto the element 181 becomes effective for producing a normal film operation in a projecting direction.

It is common practice at the present time to utilize a leader strip which is transparent. Upon the conclusion of the rewinding operation this transparent leader occupies a position in focus with respect to the light whereby it is a simple matter to obtain the requisite light for the operation of the solenoid 169 even though the heat shutter 98 is in light intercepting position. In order to prevent this transparent leader strip from being effective equally on both of the mirrors, a predetermined zone or zones thereof may be darkened to prevent the concentration of direct rays at this time onto the mirror $m$.

In usual forms of apparatus in which the film is not displaced from its usual path of travel during rewinding the problem of light control is extremely simple in both directions of travel of the film whether the rewinding be obtained through a friction drive or not. With the form of apparatus illustrated herein, however, this friction drive is extremely important in connection with the control by light at the conclusion of the rewinding operation. It will be apparent that the desired reversals in the direction of travel of the film are obtained without throwing any extra load onto the motor M. Its maximum duty, and therefore its size, may thus be determined entirely by the projecting and rewinding operations, together with cooling as hereinafter described. This enables the use of a motor of minimum size and power consumption which may be continuously operated in one direction during the use of the apparatus.

It will be obvious to those skilled in the art that unless some supplemental control for the motor is provided, it will be highly desirable to strip the film from the sprocket prior to actual reversal and at such time as the sprocket may be rotating at a speed high enough to render the film liable to injury. This may be effectively obviated by a construction such as illustrated in Figures 22 or 23.

As illustrated in Figure 22, the motor M may have a brake drum 190 with which cooperates a magnetic brake 191 under the control of magnets or solenoids 192 and 193 connected respectively in parallel with the solenoids 168 and 169, as clearly shown in the drawings. The respective circuits of the solenoids 192 and 193 each includes a movable armature piece 190'. As can be seen by those skilled in electric circuits, the armature piece 190' may be normally held by yielding means between two contacts 168' and 169' associated with the solenoids 168 and 169 respectively. The armature piece 190' may swing by gravity between the contacts 168' and 169' on a horizontal pivot 190'' as illustrated in Figure 22 or it may be normally held between the two contacts by opposed springs of well known construction. Upon energizing either of the solenoids 168 or 169 the piece 190' will be moved against the contact associated with the energized solenoid thereby energizing the associated brake-operating solenoid. Energization of either of the solenoids 168 or 169 will be effective for simultaneously applying the magnetic brake for reducing the motor speed and consequently the speed of the sprocket or other feeding means. After the film has moved a predetermined distance in a rewinding direction, the circuit to the solenoids 168 and 192 will be broken, thereby permitting the motor to operate at full speed for rewinding purposes. See Figure 34 which is a combination of Figures 11 and 22.

As stated above the solenoids 192 and 193 are connected respectively in parallel with the solenoids 168 and 169. Such parallel connection as will be obvious to one skilled in the electrical arts may be accomplished by connecting solenoid 192 (see Figure 11) from the lead 179 to the lead 180' joining both solenoids 168 and 169 with the battery 180 and connecting the solenoid 193 between lead 180' and lead 189. As likewise will be clear to one skilled in the electrical arts upon the closing of one of the control circuits lead 180' would short the pair of solenoids connected in parallel which should be inoperative and permit the operation only of the opposite pair of solenoids which should then operate.

Since it is also desirable to slow down the rotation of the sprocket 50 during its reengagement with the film, there is provided the magnetic means 193 which is operable for applying the brake as long as solenoid 169 is energized. As this solenoid may be retained in circuit until after normal projecting again commences, but is deenergized by such travel of the film, it will be apparent that the desired speed conditions are obtained at the exact time required.

In addition to effecting slowing down of the sprocket speed, it may also be desired to produce an actual dwell between the disengagement of the driving spindle clutch and the shutter clutch, and the engagement of the rewinding spindle clutch, or vice versa. This may be accomplished by the provision of a suitable timing device herein shown for purposes of illustration only as comprising a dash pot 201 with which cooperate pistons 202 and 203 carried by a projection 204 on the rack 163. The dash pot, which may be of double construction, has a controllable one way acting release 205 for each end thereof whereby the speed of travel of the piston in either direction may be controlled, the length of slot 206 through which the projection 204 extends determining the time at which the dash pot first becomes effective in either direction.

This is desirable, as initially the rack bar should move at a high speed to effect disengagement either of the driving spindle clutch and shutter clutch, or disengagement of the rewinding spindle clutch, depending on the direction of travel of the rack bar. Thereafter, the dash pot becomes effective, and by the setting of the release valves 205, variably times the period of dwell before the concluding movement of the rack bar is accomplished. This variable timing is of importance, as it provides flexibility for different operating condition, or films of different characteristics. It will be apparent to those skilled in the art that the dash pot may be of special construction having a variable speed of movement at different times, whereby it may have a gradually accelerating speed in either direction after a period of relatively slow movement.

As before set forth, titles, legends and the like are of such nature that still projection thereof accomplishes all of the results desired. Where such still projection can be obtained, it is possible to effect a saving of a very substantial portion of each length of film, as the desired matter need only appear in a comparatively few frames, the film remaining stationary while at least one of these frames is in projecting position. In order, however, to make it possible to obtain the full advantages of such an operatiton, it must be possible to change automatically from normal projection of pictures in motion to so-called still projection. The present invention embodies means by which this change in operating conditions may be automatically produced entirely by variations of light quality or intensity, and the film held stationary for a predetermined unit time interval or for a time interval representing any desired multiple of the unit interval. In Figure 11 there is illustrated diagrammatically one form of circuit by means of which this operation may be effectively obtained. In accordance with this embodiment, there may be provided a mirror $m^2$ adapted to cooperate with the film in such manner that it normally does not receive any direct rays of light from the film $f$, but cooperating therewith in such manner that by properly marking the film in a predetermined zone or zones it may be subjected to direct rays. Any rays so directed onto the mirror $m^2$ will be in turn concentrated upon a light sensitive element 207 constituting part of an electrical circuit which includes a relay 208. This circuit may be obtained by providing a connection 209 from one side of the light sensitive element 207 to the wire 182 and thence by means of this wire to the source of current 172, the opposite side of which has a connection 210 to one terminal of the relay 208, and by providing a second connection 211 between the opposite terminal of the element 207 and the opposite terminal of the relay 208. By reason of this arrangement, light concentrated upon the element 207 will decrease its resistance to an extent to permit current from the source 172 effectively to energize the relay 208 and move its armature 212 in opposition to the holding means 213. This movement of the armature is utilized for controlling the energization of a solenoid 214. This solenoiod cooperates with a core 215 which may, as a matter of operating convenience, be carried by the projection 204. The solenoid 214 when energized will be effective for moving the disk 160 in a clockwise direction. The dimensioning of the core 215 with respect to the center of the magnetic field of the solenoid 214 is such that the solenoid will only be effective for moving the disk 160 a distance sufficient to bring the pin 109 to station $S^2$, which is the station for still projection. Inasmuch as it is desirable to retain the parts in position at station $S^2$ for a predetermined unit time interval, or for a period representing a multiple of such unit intervals, it is necessary to provide means for controlling the period of deenergization of the solenoid 214 to permit the spring 167 to automatically restore the parts to normal projecting position at station $S^1$. This control may be obtained by providing a swinging contact 216 having a connection 217 to one side of a source of current 218, the opposite side of which has a connection 219 to one terminal of a time relay 220, the opposite terminal of which is connected by wire 221 to the armature 212. Thus the movement of the armature 212 under the influence of the relay 208 automatically energizes the time relay. The swinging contact 216 is of such construction and is so positioned that the circuit to the time relay is completed during the initial movement of the armature 212 under the influence of the relay. Thereafter the armature swings under and beyond the swinging contact 216, whereby the insulated portion 222 of the swinging contact is in position to be engaged by the armature upon its rearward movement.

When the time relay 220 is energized it will be effective for drawing the armature 223 to the right, as shown in the drawings, against the action of the spring 224, whereby it will be brought into engagement with the contact 225. This contact has a connection 226 to one side of the solenoid 214, the opposite side of which has a connection 227 to one side of a source of current 228, which in turn has a connection 229 to the armature. It will thus be apparent that when the time relay is energized it will be effective for closing the circuit, including the solenoid 214, which in turn will operate to move the core 215 to the left, as viewed in the drawings, and thereby produce clockwise rotation of the disk 160 to an amount sufficient to move the parts from an operating position at station $S^1$ to station $S^2$. The parts will obviously remain in this position so long as the circuit, including the solenoid coil 214, is energized. This time interval may be accurately controlled by the selection of the time relay. It may be assumed, for example, that it is desired to maintain the film in position for still or stereoptican projection for a period of fifteen seconds. In such event the time relay will be of such nature as to automatically open its circuit at the end of this period of time. This in turn will break the circuit to the solenoid 214, permitting the spring 167 to return the disk 160 to its original position in which the parts are ready for normal projection purposes.

It will be apparent that by reason of the dash pot 201 the return movement of the disk 160 will be relaitvely restricted. It is therefore necessary to prevent a second operation of the armature 212 until such time as the solenoid has become completely de-energized and the parts have returned to such a position that normal projecting movement of the film is obtained. In order to obtain this result there may be connected to the armature 212 a suitable means for limiting its speed of return movement under the influence of the spring 213. Such means may conveniently be in the form of a dash pot 230, having a piston 231 operatively connected to the armature. The piston may have a one-way valve 232 therein, and the cylinder may be provided with a regulable valve 233. With a construction of this character, the one-way valve 232 in the piston will permit the piston to travel to the left, as viewed in the drawings, at a rate of speed substantially equal to that which would be obtained if the dashpot were not provided. Upon de-energization of the relay 208, however, the return movement of the armature 212 will be delayed, the delay being so regulated by the valve 233 as to prevent a second operation of the armature 212 under the influence of the element 207 and the relay 208 until the film has actually moved out of the original position which occasioned the first operation.

If it should happen that the title is one of undue length, requiring projection for a period longer than that determined upon for the original unit, the film may be so marked that upon movement of the next picture into projecting position light will again be directed onto the mirror $m^2$ for obtaining a second operation of the relay 208 and in turn the solenoid 214. This operation may be repeated any number of times, thereby enabling a given title or other descriptive matter to be displayed for any desired period of time representing any multiple of the original unit timed interval.

It will be understood that with the parts in position at station $S^2$, the heat shield is in position and the shutter is out of operation. While it will be obvious that the shutter may be continued in operation if such action is desired, it has been found extremely desirable in many cases to effect cessation of shutter operation and movement of the heat shield into operative position substantially simultaneously. The heat shield enables the use of a light source such as to give the desired results for normal projection which is usually considered as requiring approximately 40 per cent more light than that necessary for still projection. The heat shield may then be designed to filter out or obstruct approximately 40 per cent of the light rays, thereby preventing the film from becoming injured by the heat of the light rays focused thereon. The heat shield herein shown is constructed of copper screening of a suitable mesh, although it will be understood that other forms of heat shield may be effectively utilized. In other forms of apparatus in which a heat shield has not been provided, it has been necessary in order not to injure the film during periods of still projection, to use a light source insufficient for normal projection in motion. In still other cases where a heat shield has not been provided, it has been proposed to effect actual substitution of the condensing lens system, a condensing lens of relatively high efficiency being utilized for projection of pictures in motion, while a condensing lens system of relatively low efficiency is utilized for the projection of so-called still or stereopticon pictures. The stopping of the shutter during still projection is also desirable, as it not only insures clear projection during periods of still projection, but also renders all of the light passing through the shield capable of being effectively utilized. In other forms of apparatus the shutter has been continuously operated during still projection. Thus it will be seen that for the light necessarily absorbed by the heat shield when the still projection is effected, there is approximate compensation because of the cessation of movement of the shutter.

In Figure 23 of the drawings there is illustrated a slightly modified form of the present invention by means of which it is possible to eliminate entirely the heat shield while still obtaining all of the advantages previously referred to. It will be apparent that since the object of a heat shield is to cut down the effective light concentrated on the film, it is possible to obtain all of the results and benefits obtained by a heat shield by merely varying the amount of resistance in the lamp circuit. For example, the amount of resistance may be increased during periods of still projection while the amount of resistance may be decreased during periods of normal projection. As illustrated in Figure 23 of the drawings, this may be obtained by entirely omitting the heat shield shaft 99 and its associated parts, including the heat shield, and utilizing the free end of the lever 129 as a rheostat arm directly cooperating with a resistance 234. This resistance is connected at one end with a source of current 235, the opposite side of which is connected to one terminal of the projecting lamp L. The opposite terminal of the projecting lamp may have a connection 236 with the lever 129. With the parts in normal projecting position the lever 129 will occupy the position illustrated in Figure 23 of the drawings in full lines, in which all of the resistance 234 is out of the lamp circuit, thereby providing a maximum available voltage for lighting purposes. With the parts in operative position at all of the other stations, however, the lever 129 will occupy the dotted line position shown in Figure 23 of the drawings, in which a considerable amount of the resistance 234 is effectively cut into the projecting lamp circuit. A decreased lamp intensity will therefore be available for periods of projection of still or stereopticon pictures, during the operations of threading or changing a film, and during the rewinding operation. It will be understood that this figure of the drawings is largely diagrammatic, it being possible to position the resistance 234 at any desired point, as, for example, in the lamp housing H wherein it will be under the influence of a blast of cooling air as will hereinafter be more fully apparent.

Where the shutter is stopped during periods of still projection it is necessary to insure means for stopping it in such position that it will not be in the path of projection of the picture being projected. This may be insured, as shown, for example, in Figure 24 of the drawings, by providing on the shutter shaft 56 a cam 237 with which cooperates a spring-pressed roller 238. If the disengagement of the shutter shaft should occur at a time when the roller is on one of the high points of the cam 237, it will be effective for rotating the shutter shaft, as will be obvious. The high points of the cam occupy a definite relation to the shutter blades, so that the rotation, if any, effected by the roller 238 will properly position the shutter.

In other cases, as illustrated, for example, in Figure 25 of the drawings, the same results may be obtained magnetically. This magnetic operation may be produced by providing on each shutter blade a button 239 of magnetic material, or permanently magnetized material. Carried by the frame F in such position as to cooperate with two blades of the shutter simultaneously, are magnets 240 adapted to attract the buttons 239 and thus properly position the shutter. If desired, the magnets instead of being permanent, may be connected in parallel with the solenoid 214, whereby during all periods when the solenoid 214 is effective for producing still projection, the magnets 240 will be energized.

Figure 12:
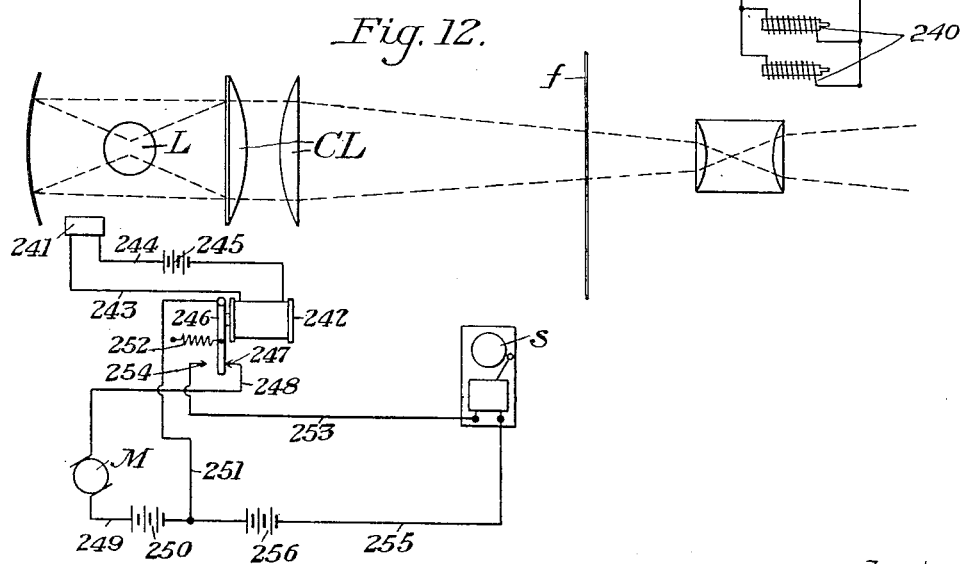
Figure 12 is a diagrammatic view illustrating the manner of stopping the operation of the apparatus in the event of failure of the light source.

Reference has heretofore been made to the desirability, at least in certain cases, of effecting stopping of the motor M in the event of failure of the light source L. This may be conveniently accomplished by an arrangement as illustrated more or less diagrammatically in Figure 12, which comprises a light sensitive element 241 so positioned as to be normally subjected to light from the projecting lamp L. This element may be connected in series with a relay 242 by connecting one side of the relay and one side of the element 241 by a suitable wire 243, and by connecting the opposite side of the photo electric or light sensitive element by means of a wire 244 and source of current 245 to the opposite side of the relay. By reason of this arrangement the relay will normally be energized, thereby holding its armature in engagement with a contact 247. This contact has a connection 248 to one side of the motor M. The opposite side of the motor has a connection 249 to one side of a source of current 250, while the opposite side of the source of current has connection 251 to the armature 246. Due to this arrangement, with the armature 246 in a position in which it is maintained normally by the relay 242 and energized, the motor circuit will be closed. In the event of failure of the light, however, the light sensitive element 241 will automatically increase the resistance to the flow of current therethrough, thereby permitting the spring 252 to draw the armature 246 out of circuit-closing position for the motor. In this manner the motor circuit will be automatically broken upon failure of the light source. If desired, this movement of the armature upon failure of the light source may also be utilized for giving a visual or audible signal. This may be accomplished by providing a suitable signal s having one terminal thereof connected by a wire 253 to a fixed contact 254 adapted to be engaged by the armature 246 when it is moved under the influence of the spring 252. The opposite side of the signal may have a connection 255 to one side of a source of current 256, the opposite side of which is connected to the wire 251 to the armature. In this manner, breaking of the motor circuit will be accompanied by a signal which will indicate to an operator the necessity of some attention to the apparatus.

In Figure 13 there is illustrated, more or less diagrammatically, one form of circuit operable in the event of film breakage for automatically opening the motor circuit and also giving a suitable signal. In this figure there is illustrated a mirror $m^3$ which, during normal film operation, is not adapted to receive any direct light rays. In the event of film breakage, however, it will directly receive light rays and focus the same onto a light sensitive element 260. This element is connected in series through a source of current 261 with a relay 262, whereby in the event of concentration of light onto the element 260 the relay will be energized for drawing its armature 262' to the right, as viewed in the drawings, against the action of the spring 263. This movement will be effective for opening the motor circuit, as will be obvious, and at the same time will be effective for closing the circuit which includes the signal device $s'$. If desired, the mirror $m^3$ may be positioned in such manner that normally it receives a relatively small amount of light during operations with the film intact. In the event of film breakage, however, there will be a marked increase in the amount of light concentrated onto the mirror, which will in turn be effective for decreasing the resistance of the light sensitive element 260 for obtaining relay operation as before set forth.

In Figure 14 of the drawings there is diagrammatically indicated a form of control device effective for signalling or actually producing the initiation or cessation of an associated operation. Such results may be obtained by providing a mirror $m^4$ which is normally not adapted to receive any direct light rays, but which may have light rays directly focused thereon by properly marking the film $f$. Such light rays will in turn be focused onto a light sensitive element 264 controlling the energization of a relay 265. When the resistance to current flow of the light sensitive element 264 is sufficiently decreased, the relay will be effective for moving its armature 266 to the right, for closing the power or signalling circuit PC for effecting the desired operation. For purposes of illustration, this power circuit may include a phonograph, house lights, signals, radio, advertising or display means, or other desired apparatus as may be found advantageous. Such circuit may also include a loud speaker or an exciter lamp of a sound head used in connection with sound symbols appearing upon the film which is being projected, such sound head being ordinarily constructed as a part of the film handling apparatus. The reverse may also be true, and a power circuit P'C' opened under such conditions.

In Figure 21 of the drawings there is illustrated diagrammatically a form of circuit similar to that illustrated in Figure 11, but differing therefrom in that the mirrors $1m$, $1m'$ and $1m^2$ normally all receive light rays, whereby the circuits to the relays 174', 184' and 208' are all normally closed. In this figure, parts corresponding to parts previously described in connection more particularly with Figure 11, are designated by the same reference numbers having a prime affixed thereto in each instance, and by the same reference letters having the numeral 1 prefixed thereto. With this form of apparatus the results which are obtained are exactly similar to those which are obtained by Figure 11, with the exception that the film markings are reversed in such manner that when it is desired to produce any operation the light will be cut off from the mirror which controls the circuit responsible for the production of such operation.

In Figures 15, 16 and 17 there are illustrated different forms of film markings adaptable for use with a circuit of the character illustrated, for example, in Figure 11, while in Figures 18, 19 and 20 there are illustrated film markings which are adaptable, for example, with a circuit of the character illustrated diagrammatically in Figure 21. These figures will now each be described in detail.

In Figure 15 of the drawings there is indicated a section of film in which the adjacent pictures are normally separated by a black line or border 267 which extends continuously from one sprocket opening in one side of the film to the sprocket opening in the opposite side of the film. With such a film construction the mirrors utilized for signalling or other purposes will normally be so positioned that these black lines or borders will prevent the passage of light thereto with a form of circuit as shown, for example, in Figure 11 of the drawings. In case only the mirrors $m$, $m'$ and $m^2$ are utilized, it may be decided to allot the left hand third portion of each black line or border to the control of the mirror $m$, the central third to the control of the mirror $m^2$, and the right hand third to the control of the mirror $m^3$. In this construction, when it is desired to change from normal projection in motion to so-called still or stereopticon projection, the central third of the border may be left light to provide a transparent portion 268 in any desired number of frames, which will permit the passage of light rays directly to the mirror $m^2$ for producing the desired operation. At the trailing end of the film the left hand third of each border will be omitted to provide transparent portions 269 through which light rays may be transmitted directly to the mirror $m$ in order to produce the desired rewinding operation, while on the leading end of the film the right hand third of each band or border will be omitted, as indicated, to provide transparent portions 270 permitting the passage of light rays directly to the mirror $m^3$ for again producing normal projection. In types of machine in which the film is not in the frame at the conclusion of the rewinding operation, the entire left hand two-thirds of the leader may be blackened to prevent possibility of simultaneous projection of light rays to all of the mirrors.

In Figure 16 of the drawings there is illustrated a modified film arrangement in which one edge of the film is utilized for effecting the desired control. With this construction one edge of the film may have a substantially continuously extending darkened edge to prevent the normal passage of high intensity rays therethrough. The lower third of the edge portion of each frame may be allotted to the mirror $m$, the central third to the mirror $m^2$ and the upper third to the mirror $m^3$. Thus, transparent aperture 271 will permit the passage of light rays to the mirror $m$, transparent aperture 272 will permit the passage of light rays to the mirror $m^2$, while aperture 273 will permit the passage of the light rays to the mirror $m^3$.

In Figure 17 there is illustrated still another form of film in which a supplemental portion is provided on one edge of the film for the express purpose of controlling the passage of light to the mirrors provided for controlling purposes. This edge portion may be divided in any desired manner, but it is herein illustrated as divided in a manner similar to that shown in Figure 16, whereby lower transparent portions 274, central transparent portions 275 and upper transparent portions 276 are provided at desired points.

In Figures 18, 19 and 20, respectively, there are shown films corresponding to those shown in Figures 15, 16 and 17, but in which the conditions are exactly reversed, whereby there is provided a film adaptable for use with a circuit as shown, for example, in Figure 21, the films of Figures 15, 16 and 17 being available for use with a circuit of the nature shown in Figure 11. In Figures 18, 19 and 20 the reference characters used correspond respectively to those utilized in Figures 15, 16 and 17 having, however, a prime applied thereto.

In Figure 20' there is illustrated still another form of film adaptable for use in accordance with the present invention. With this arrangement the area within the frames themselves is utilized for control purposes, it being obvious that one or more frames at widely spaced intervals in the film may be easily used for control purposes without interfering with the character of picture shown or the quality of projection. Thus, the area 277 may be utilized, for example, for controlling the passage of light to a mirror $m$, the portions 278 may be utilized for controlling the passage of light to a mirror $m^2$, the portions 279 may be utilized for controlling the passage of light to mirror $m^4$, and the portions 280 may be utilized for controlling the passage of light to mirror $m^3$. It will be obvious to those skilled in the art that with any of the forms of film shown herein any desired sub-dividing of the edges, spaces between the pictures, supplemental edge portions, or the picture area itself may be utilized as desired in accordance with the number and arrangement of mirrors provided in the apparatus.

In Figure 28 there is illustrated somewhat diagrammatically one arrangement of mirrors suitable for use, for example, with a film of the arrangement shown either in Figure 15 or 18. In this figure the normal aperture is indicated at 281, this aperture having its lower portion constructed to receive the mirrors $m$, $m^2$, and $m^3$, respectively. It will be obvious that these mirrors, thus positioned, normally extend in direct alignment with the bands or borders between adjacent pictures. In Figure 29 there is illustrated a section taken on the line XXIX—XXIX of Figure 28 for the purposes of illustrating one angular arrangement of the mirrors below the aperture.

In many of the attached claims, the light sensitive element as a matter of brevity and convenience is said to be actuated by "light passed through said predetermined portion of the film" and impinging upon the element. It will of course be understood that the actuation of any light sensitive element follows differences in the light transmitting characteristics of successive correspondingly placed portions of the film. As a matter of literal fact, therefore, the actual control exercised by the light sensitive element may follow either light which is transmitted, or light which is not transmitted. Relative light and dark, in either order, exercise the control. The above quoted phrase and other similar phrases are therefore to be taken to include either condition. It will also be understood that the claims are to be construed in all respects to include light-sensitive elements which are actuated by relative increase of light or relative decrease of light.

The housing H is adapted to contain the combined lighting, resistance and ventilating units, and where desired the resistance 234 provided for the projecting lamp L. This lamp may be adjustably carried within the housing in any desired manner, as by bracket 282 having a pivotal mounting 283 in a bracket 284. Also having a pivotal mounting in the bracket 284 is a reflector R'.

Secured to one side of the housing H is a resistance carrying unit 285 having a suitable resistance for the lamp L. Also mounted on the housing, and preferably exteriorly thereof, is a second resistance 286 with which cooperates a control finger 287 by means of which the resistance may be cut into or out of the motor operating circuit at will.

The housing H at its lower end is preferably in spaced relation to the base B to permit the free circulation of air into the housing, and the top of the housing is closed by a slatted or Louvre cover 288 permitting the egress of heated air from the housing. A positive circulation of cooling air through the housing is preferably continuously maintained in such manner as to be effective both on the lamp L and the lamp resistance 285, as well as the lamp resistance 234, where it is positioned within the lamp housing. This circulation may be maintained by means of a fan 289 of suitable construction mounted in the fan casing 290 and driven by an extension 291 of the armature shraft of the motor M.

In Figure 30 there is shown a slightly modified form of aperture in which light sensitive elements, such as the elements 170, 181, 207, 260 and 264 may be directly placed so to be acted upon directly by the light rays without the necessity of providing an intervening mirror as heretofore set forth. This arrangement may be generally similar to that shown, for example, in the patent to Jenkins No. 1,348,566 of August 3, 1920, but differing therefrom in not having each cell extend the full width of the aperture, whereby a number of cells may be utilized.

In Figures 26 and 27, of the drawings, there is illustrated a modified mechanical embodiment of the invention which has been found to be desirable in many cases where light is utilized for controlling the character or speed of operation of an apparatus of the general nature herein contemplated, or incidental operations of value in connection therewith. With the form of apparatus heretofore described, the shutter 68 was positioned at the extreme front of the apparatus in advance of the objective lens. With such a shutter arrangement, there is no means for practically cutting off light from the light sensitive elements, or the mirrors which control such elements during the periods of travel of the film to bring a new frame into position. With a shutter located as before described, the desired operation must be obtained by reason of the difference in time devoted respectively to projection and to film movement. Ordinarily, the ratio is about four to one, the greater time obviously being available for projection purposes.

In the embodiment illustrated in Figures 26 and 27, however, the shutter 68' is located intermediate the gate section 42' and the objective lens holder 292, so that light from the projecting lamp is cut off from the objective lens during periods of movement thereof. This modified shutter mounting may be provided by providing a casting 293 adapted to be secured directly to one side of a main frame F", and having a shaft receiving extension 294 passing through an opening 295 in the frame. Mounted in the extension 294 is a shaft 296 carrying at one end a spiral gear 297 adapted to mesh with a similar gear 298 on the shaft 56', corresponding to the shaft 56 before described. The opposite end of the shaft 296 extends into an enlargement 299 and is provided with a spiral gear 300 meshing with a similar gear 301 on a longitudinally extending shaft 302. The shaft 302 at one end carries the shutter 68' which may be secured in position by the driving disk 303. The casting 293 may have a curved recess 304 adapted to receive the objective lens holder 292.

Inasmuch as the shaft 56', corresponding to the shaft 56 before described, has its rotation stopped during periods of still projection, film changing or rewinding, it will be apparent that the shutter 68' operates during the same periods as those previously referred to.

In Figure 31 there is illustrated, more or less diagrammatically, a modified embodiment of the present invention, by means of which the tension of the film may be utilized, for example, for obtaining a reversal in the direction of film travel. As indicated here, the upper brake lever 88', which may be of a construction generally similar to that heretofore described, is adapted in its lower position to engage a contact 305. This contact may be connected by a wire 306 to one side of a suitable source of electric current, the opposite side of which is connected to one terminal of the solenoid 169, which is operable for controlling the movement of the parts in such manner as to produce a normal movement of the film in a feeding direction for projection purposes. The opposite side of the solenoid is connected by a wire 307 to a suitable point on the lever 88'. By reason of such a construction, when the rewinding of the film is completed, the tension created in attempting to pull the film from the lower reel or carrier will be effective for swinging the brake lever 88' downwardly and into engagement with the contact 305. This will automatically result in a reversal of the direction of travel of the film, as will be apparent.

If desired, the lever 88' may cooperate with a circuit 307' including any desired means the circuit to which it is desired to break when the lever moves downwardly under the film tension. The circuit 307' might, for example, include the motor in cases where cessation of motor operation under predetermined film tension was desirable. Likewise, the lever 88' instead of closing a circuit to the solenoid 169 might close a circuit to other means as indicated diagrammatically at M'.

In Figure 32, we have illustrated, more or less diagrammatically, a construction in which the cessation of motor operation, obtained, for example, in a manner as hereinbefore set forth, will be effective for performing certain operations, such as moving the parts of the apparatus to inoperative position at station S2. This may be accomplished by providing the driving shaft 21 with a centrifugally operated switch 308. This switch may comprise a disk movable axially of the driving shaft, and normally urged to the left, as viewed in Figure 32, by a compression spring 309, movement in the opposite direction being effected by centrifugally operated means 310, as well understood. By reason of this construction, so long as rotation of the shaft 21 continues, the disk will be moved to the right in position to the spring 309, and out of engagement with the contacts 311 and 312, respectively. In the event that the shaft 21 ceases rotation, the disk will move to the left and establish a circuit through the coil 214, as will be apparent from the drawings, thereby automatically effecting movement of the parts to station S2. It will be apparent that a centrifugally operated switch of this general character might be utilized for obtaining any other desired control.

Throughout the foregoing description, reference has been made to projecting apparatus. It will be apparent, however, that many portions of the apparatus are inherently capable of use for regular photographic purposes in the taking of pictures or for a printer for the duplication of films.

In this specification, this invention has been illustrated as applied to a fully developed automatic film handling apparatus in which all of the operable parts of the apparatus are controlled by light which has passed through the film. It is to be definitely understood, however, that the invention is also applicable to less fully developed apparatus in which only a portion of the above described operable parts are automatically controlled by light-responsive means. The automatic rewinding operation is desirable, for example, but it is not necessary to the automatic operation of all or a portion of the other operations. For example, the apparatus may be placed in the S3 position and the film placed within the open gate. Thereupon the light responsive control mechanism, under the influence of the transparent leader strip, for example, as previously described herein, automatically and fully threads the film. At the conclusion of the projecting operation so begun, the film might or might not be automatically rewound. This apparatus hereinabove described could easily be used, if desired, to stop the motor and extinguish the light after either a projecting or rewinding operation. Similarly, for example, a succession of still pictures, whether titles or views, could be shown under this invention without necessarily involving the other automatic control means. While it is preferred for most purposes the completely automatic machine herein described, the automatic control of any of the operable parts of the apparatus or the control of an associated apparatus or circuit, may be carried out independently of the completely automatic control.

The apparatus described herein is one in which the complete circle of all threading and subsequent operations is carried out by the light responsive means which are described. It must be definitely understood, however, that any one segment of such circle, so to speak, may be employed alone, or, if desired, a plurality of segments, not necessarily contiguous. For example of this latter statement, one automatic light control means may be employed to thread the film and to stop it after it has been fully (or partially) shown, manual means employed as shown, to rewind the film after showing, and automatic light responsive means employed to stop the rewinding operation. The mere omission of certain of the signalling portions placed upon the film, together with the omission of their function, for example, would not remove an apparatus from the ambit of this invention.

In this specification and in the appended claims, the word "film" is used as applied to any strip or band of material which may bear thereupon spaced portions having different degrees of translucency, such differences being available for operating the light responsive control means. Also, the invention is applicable to forms of apparatus in which light, instead of being passed through the material, is reflected therefrom. It will be understood by those skilled in the art that fluctuations in the amount of light, no matter how obtained, are necessary for the operation of the control means.

Certain of the advantages of our invention appear from the above portion of this specification. Other advantages arise from the provision of improved means for controlling the intensity of the light in accordance with the operation to be performed, as for example for reducing the intensity of the light in a motion picture apparatus when the film is stationary in the aperture of the apparatus or is being rewound when an unusual strength of light is not desired. Other advantages arise from the provision of improved means for controlling the amount of light passing to or through a film by variations in the density of the film to or through which the light is passed.

Other advantages arise from a provision of an improved brake operating means for applying a brake to power driven apparatus, such brake operating means being suited for operation concomitantly with the operation of a control mechanism for such mechanism. Other advantages arise from the provision in a motion picture apparatus of means for stopping the shutter in a predetermined position subsequently to the operation of the brake device for slowing down the speed of the entire apparatus including the shutter.

Still other advantages arise from an improved connection of a shutter and the intermittent feeding member with the other operable members of a moving picture apparatus, whereby the shutter and intermittent feeding member may be stopped in a predetermined position after being disconnected from the remainder of the moving members of the apparatus so as to free the shutter from the momentum of heavier moving members of the apparatus.

Certain advantages of the present invention arise from the provision of an apparatus for the repetition display of a length of film in which the desired operating cycles are obtained automatically by light under such conditions that the possibility of injury to the film by heat or extra load is materially minimized.

Other advantages arise from the provision of a light control in apparatus of the general nature herein contemplated effective automatically for determining the character of film movement, the direction of film movement, the speed of operation of the parts prior to and after each change in operating conditions, as well as incidental control operations.

Further advantages arise from the improved means for controlling the light effective on a film entirely by light from the film, whereby during periods of still projection, film changing or rewinding, the amount of light reaching the film is reduced.

Still other advantages arise from the provision of improved control means actuated by light and effective for automatically obtaining any desired condition of operation or control of a photographic apparatus.

Still a further advantage of the present invention resides in its adaptability to the operation and/or control of associated circuits, devices or the like.

We claim:

1. In combination, a film having one portion of a degree of translucency differing from that of a corresponding portion and a film handling apparatus; said film handling apparatus including two supports for said film, a member engaging the film between said supports for feeding the film from one of said supports towards the other thereof, a source for passing light through the film, a motor for driving said feeding member, a braking device operable for changing the speed of said motor, means for operating said braking device, and control mechanism responsive to light passed from said source through said portions for actuating said operating means.

2. In combination, a film having two spaced zones of a degree of translucency differing from that of corresponding portions of film intervening therebetween and a film handling apparatus; said film handling apparatus including two supports for said film, a member engaging the film between said supports for feeding the film from one of said supports toward the other thereof, a source for passing light through the film, a motor for driving said feeding member, a braking device operable for reducing the speed of said motor, means for operating said braking device for a predetermined period, means for releasing said braking device after said predetermined period, and control mechanism including devices, responsive to light from said source passing through one of said zones, for actuating said brake operating means for applying said brake, and devices, responsive to light from said source passing through the other of said zones, for leasing said braking devices.

3. In a film handling apparatus, a member for feeding a film, a continuously operating driving mechanism for said feeding member, operable means for operatively connecting said feeding member and said driving mechanism, a source for passing light through the film, a brake device operable for reducing the speed of said driving mechanism, and sequential control means interconnecting said brake device and said connecting means for operating said brake device before the operation of said connecting means, said sequential control means including devices responsive to light passed from said source through a portion of the film of a degree of translucency differing from that of another corresponding portion of the film for operating said control means, the film being formed with such portions.

4. In a film handling apparatus having a plurality of operable parts including means for moving a film, continuously operating mechanism for driving said parts, a brake for reducing the speed of said driving mechanism, a source for passing light through the film, the film having a portion of a degree of translucency differing from that of another portion, a photo-electric cell placed upon the side of the film opposite from said light source, and means actuated by said photo-electric cell under the influence of light passed through said portions of differing translucency for operating said brake.

5. In a photographic apparatus, a source of electric light, means for feeding a film past light from said source, means for rendering said feeding means operative upon the film, a circuit for said light source, means for changing the amount of current which passes through said light source, control means operatively interconnecting said means for rendering said feeding means operative upon the film and said current changing means, a photo-electric cell positioned to receive light which passes from said light source to portions of the film of varying degrees of translucency, the film being formed with such portions, and an operating connection between said cell and said control means.

6. In a photographic apparatus, a source of electric light, means for feeding a film past light from said source, means for controlling the movement of said feeding means, a circuit for said light source, resistance connectible in said circuit, means for varying said resistance, electromagnetic means for operating said resistance-varying means, control means operatively interconnecting said means for rendering said feeding means operative upon the film and said electro-magnetic means for operating both of said means, and means responsive to light passed from said source through a portion of the film having a degree of translucency differing from that of another portion thereof for actuating said control mechanism, the film being formed with such portions.

7. In a film handling apparatus having a plurality of operable parts, film feeding means, a source of electric light cooperating with the film, means for varying the current consumption of said light source, a movable shutter for cooperation with the film and said light source, means for moving said shutter, means for controlling the movement of said shutter, and means operatively interconnecting said movement controlling means and said current varying means and operable by light from successive portions of the film of varying degrees of translucency for operating both of said means, the film being formed with such portions.

8. In a film handling apparatus including a plurality of operable parts and means for feeding a film, an electrical source for passing light to the film, means for changing the current consumption of said light source, a movable shutter for obscuring said light source, means for disconnecting said said shutter from said other operable parts of said apparatus, and control mechanism operatively interconnecting said disconnecting means and said means for changing the current consumption of said light source and actuated by light from said source passed through a portion of the film having a degree of translucency differing from that of another portion of the film for concomitantly actuating said means for changing said current consumption concomitantly with the operation of said stopping means, the film being formed with such portions.

9. In a film handling apparatus, mechanism operable for moving a film in either of two directions, a source for directing light upon the film, driving means for said mechanism, a brake operable for changing the speed of said driving means, control means operatively interconnecting said mechanism and said brake for operating said brake intermediate a change in the direction of movement of the film, and means responsive to light from said source passing through a portion of the film having a degree of translucency differing from that of another portion for actuating said control means, said film being formed with such portions.

10. In a film handling apparatus having means for feeding a film therethrough in either direction, means for determining the direction in which the film is fed, a source of electric light for cooperation with the film as it is being fed, means for changing the current consumption of said light source, control means interconnecting said direction determining means and said current changing means for controlling both thereof, and means actuated by light passed from said source to the film as modified by portions of the film having different degrees of translucency for operating said control means, the film being formed with such portions.

11. In a film handling apparatus having means for feeding a film therethrough in either direction, said means being alternatively operable, mechanism for driving said feeding means, means for determining the direction in which the film is fed, a brake for reducing the speed of operation of said driving mechanism, means for applying said brake between each change in the direction of film feeding, a source of electric light for cooperation with the film as it is being fed, means for changing the current consumption of said light source, means for operating said current changing means between each change in the direction of film feeding, control means interconnecting said brake applying means and said means for operating said current changing means for controlling both of said means, and means actuated by light passed from said source to the film as modified by portions of the film having different degrees of translucency for operating said control means, the film being formed with such portions.

12. In a film handling apparatus, an openable gate, a source of electric light directed upon said gate, means for changing the amount of current which passes through said light source, means for opening and closing said gate, and means interconnecting said changing means and said gate opening and closing means for passing a reduced amount of current to said light source while said gate is open.

13. In a film handling apparatus, an openable gate, means operable for opening and closing said gate, a source of electric light directed upon said gate, means for changing the amount of current which passes through said electric light source, and means controlled by the film and operatively interconnecting said current changing means and said gate opening and closing means for passing a reduced amount of current to said light source while said gate is open.

14. In a film handling apparatus, a gate having a fixed section and a section movable relatively thereto, a source of electric light directed upon said gate, resistance connectible in the circuit of said light source, means for connecting said resistance in said circuit, means for moving said movable section relatively to said fixed section, and control mechanism operatively interconnecting said means for connecting said resistance in said circuit and said means for moving said movable gate section for operating both of said means.

15. In a film handling apparatus, a gate, said gate including a fixed section and a section movable relatively thereto, means for moving said movable gate section relatively to said fixed gate section, an electrical light source for directing light upon said gate, a variable resistance in circuit with said light source, a movable wiper arm for said resistance, and control means operatively interconnecting said wiper arm and said means for moving said movable gate section for concomitantly operating said moving means and moving said wiper arm.

16. In a film handling apparatus, an openable sectional gate through which a film may be fed, means for feeding the film through said gate, driving mechanism for said feeding means, a brake for said driving mechanism, means for controlling the application of said brake to said driving mechanism, means for moving one of the sections of said gate relatively to another thereof, an electrical source for passing light to the film fed through said gate, resistance connectible in the circuit of said light source, means for connecting said resistance in said circuit, means for moving one of said gate sections relatively to another, and control mechanism operatively interconnecting said gate moving means, said resistance changing means, and said brake controlling means for concomitantly operating all of said means.

17. In a film handling apparatus having toothed film feeding means, presser means operable for bringing a film into operative relation with said feeding means, a source of electric light for cooperation with the film, resistance means operable for varying the current consumption of said electric light source, and control means interconnecting said presser means and said current varying means for operating said presser means and said current varying means.

18. In a film handling apparatus having toothed feeding means, presser means operable for bringing a film into operative relation with said feeding means, a source of electric light for cooperation with the film, resistance means operable for varying the current consumption of said electric light source, and means controlled by the film and interconnecting said presser means and said current varying means for operating said presser means and said current varying means.

19. In a film handling apparatus having toothed film feeding means, presser means operable for bringing a film into operative relation with said feeding means and movable between a first or inoperative position wherein it is disposed relatively distantly from said feeding means a second or operative position wherein it presses the film thereagainst, a source of electric light for cooperation with the film, means for passing a predetermined amount of current through said light source while said presser member is disposed in said first or inoperative position, means for passing a relatively increased amount of current through said light source while said presser member is disposed in said second or operative position, means for moving said presser member between said position, and control mechanism operatively interconnecting said moving means and both of said current passing means for operating all of said means.

20. In a film handling apparatus, a member for feeding a film, a presser member, means for moving said presser member in relation to said feeding member, an electric source of light for cooperation with the film, a variable resistance in circuit with said light source, a movable wiper arm for said resistance, and control means operatively interconnecting said wiper arm and said means for moving said presser member for concomitantly operating said moving means and moving said wiper arm.

21. In a film handling apparatus having toothed film feeding means, presser means operable for bringing a film into operative relation with said feeding means, a source of electric light for cooperation with the film, means operable for changing the current consumption of said electric light source, and control means interconnecting said presser means and said current changing means for operating said presser means and said current changing means, said means including an element positioned to receive light from said source after it has been modified by portions of the film having different degrees of translucency for actuating said control means said film being formed with such portions.

22. In a film handling apparatus having toothed film feeding means, means operable for rendering said toothed means inaccessible by the film, a source of electric light for cooperation with the film, means operable for changing the amount of current passing through said electric light source, and means interconnecting said means for rendering said feeding means inaccessible and said current changing means for operating said means for rendering said feeding means inaccessible and for passing a reduced amount of current to said light source after said means for rendering said feeding means inaccessible has been operated.

23. In a film handling apparatus having toothed film feeding means, means operable for rendering said toothed means inaccessible by the film, a source of electric light, means operable for varying the current consumption of said electric light source, and means controlled by the film and interconnecting said means rendering said feeding means inaccessible and said current varying means for operating both of the same.

24. In a film handling apparatus having toothed film feeding means, means operable for rendering said toothed means inaccessible by the film, a source of electric light for cooperation with the film, resistance connectible in the circuit of said light source, means for connecting said resistance in said circuit, and means interconnecting said means for rendering said toothed means inaccessible by the film and said resistance connecting means for operating both of said means.

25. In a film handling apparatus, a toothed member for feeding a film, operable means for separating the film and the teeth of said member, means for operating said separating means, an electric source of light for cooperation with the film, a variable resistance in circuit with said light source, a movable wiper arm for said resistance, and control means operatively interconnecting said wiper arm and said means for operating said separating means for concomitantly operating both thereof.

26. In a film handling apparatus, a continuously operating delivery member and a continuously operating taking up member between which a film extends, an intermittent feeding means engaging the film between said members, means for increasing the length of the stretch of film which extends between at least one of said continuously operating members and said intermittent feeding means, said means including a member engaging the film between said continuous member and said feeding means, a source for passing light to the film, means for changing the amount of current which passes through said light source, means for moving said film engaging member thereby operating said length increasing means to increase the stretch of film between said continuous member and said intermittent feeding means whereby compensation may be secured for the difference in character of movement between said continuous member and said intermittent feeding means, and control mechanism operatively interconnecting said current changing means and said means for moving said length increasing member for concomitantly operating both of said means.

27. In a film handling apparatus, a continuously operating delivery member and a continuously operating taking up member between which a film extends, intermittent feeding means engaging the film between said members, means movable between one position wherein a short path is defined between said members in which the film is initially threaded and another position wherein a long path is defined therebetween through which the film is regularly moved in the feeding operation, a source for passing light through the film, means for changing the amount of current which passes through said light source, means for moving said path defining means from one of said positions to the other, and control mechanism operatively interconnecting said current changing means and said means for moving said path defining means for concomitantly operating both of the same.

28. In a film handling apparatus, a continuously operating delivery member and a continuously operating taking up member between which a film extends, intermittent feeding means engaging the film between said members, a member movable between a position wherein it engages the film between said intermittent feeding means and one of said continuous members for exerting a tensioning influence upon a stretch of the film therebetween for assisting the feeding operation and a position wherein it is without such influence upon the film, means for moving said tensioning member from one of said positions to the other thereof, an electrical source for passing light through the film, and means for changing the amount of current which reaches said light source, control mechanism operatively interconnecting said current changing means and said tensioning member for concomitantly operating both of the same.

29. In a film handling apparatus, a continuously operating delivery member and a continuously operating taking up member between which a film extends, an intermittent feeding means engaging the film between said members, means for increasing the length of the stretch of film which extends between at least one of said continuously operating members and said intermittent feeding means, a source for passing light to the film, means for changing the amount of current which passes through said light source, means for operating said length increasing means thereby increasing the length of the stretch of film between said continuous member and said intermittent feeding means whereby compensation may be secured for the difference in character of movement between said continuous member and said intermittent feeding means, and film-actuated control mechanism operatively interconnecting said current changing means and said means for operating said length increasing means for concomitantly operating both of said means.

30. In a film handling apparatus, a continuously operating delivery member and a continuously operating taking up member between which a film extends, intermittent feeding means engaging the film between said members, means movable between one position wherein a short path is defined between said members in which the film is initially threaded and another position wherein a long path is defined therebetween through which the film is regularly moved in the feeding operation, a source for passing light through the film, means for changing the amount of current which passes through said light source, means for moving said path defining means from one of said positions to the other, and film-actuated control mechanism operatively interconnecting said current changing means and said means for moving said path defining means for concomitantly operating both of the same.

31. In a film handling apparatus, a continuously operating delivery member and a continuously operating taking up member between which a film extends, intermittent feeding means engaging the film between said members, a member movable between a position wherein it engages the film between said intermittent feeding means and one of said continuous members for exerting a tensioning influence upon a stretch of the film therebetween for assisting the feeding operation and a position wherein it is without such influence upon the film, means for moving said tensioning member from one of said positions to the other thereof, an electrical source for passing light through the film, and film controlled means for changing the amount of current which reaches said light source, and film actuated control mechanism operatively interconnecting said current changing means and said tensioning member for concomitantly operating both of the same.

32. In a film handling apparatus, a continuously operating delivery member and a continuously operating taking up member between which a film extends, an intermittent feeding means engaging the film between said members, means for increasing the length of the stretch of film which extends between at least one of said continuously operating members and said intermittent feeding means, a source for passing light to the film, means for changing the amount of current which passes through said light source means for operating said length increasing means thereby increasing the length of the stretch of film between said continuous member and said intermittent feeding means whereby compensation may be secured for the difference in character of movement between said continuous member and said intermittent feeding means, control mechanism operatively interconnecting said current changing means and said means for operating said length increasing means for concomitantly operating both of said means, and means responsive to light passed to a portion of the film having a degree of translucency differing from that of another corresponding portion thereof for actuating said control mechanism, the film being formed with such portions.

33. In a film handling apparatus, a continuously operating delivery member and a continuously operating taking up member between which a film extends, intermittent feeding means engaging the film between said members, means movable between one position wherein a short path is defined between said members in which the film is initially threaded and another position wherein a long path is defined therebetween through which the film is regularly moved in the feeding operation, a source for passing light through the film, means for changing the amount of current which passes through said light source, means for moving said path defining means from one of said positions to the other, control mechanism operatively interconnecting said current changing means and said means for moving said path defining means for concomitantly operating both of the same, and means responsive to light passed to a portion of the film having a degree of translucency differing from that of another corresponding portion thereof for actuating said control mechanism, the film being formed with such portions.

34. In a film handling apparatus, a continuously operating delivery member and a continuously operating taking up member between which a film extends, intermittent feeding means engaging the film between said members, a member movable between a position wherein it engages the film between said intermittent feeding means and one of said continuous members for exerting a tensioning influence upon a stretch of the film therebetween for assisting the feeding operation and a position wherein it is without such influence upon the film, means for moving said tensioning member from one of said positions to the other thereof, an electrical source for passing light through the film, means for changing the amount of current which reaches said light source, control mechanism operatively interconnecting said current changing means and said tensioning member for concomitantly operating both of the same, and means responsive to light passed to a portion of the film having a degree of translucency differing from that of another corresponding portion thereof for actuating said control mechanism, the film being formed with such portions.

35. In a photographic apparatus, an image carrying material, an electric light source cooperating therewith, means for bringing said material into operative position relatively to said light source whereby light from said source reaches an image carried by said material and is modified by the degree of translucency thereof, means for varying the current consumption of said light source an appreciable amount, and means operable by light so modified for operating said current-varying means.

36. In a film handling apparatus, an image carrying material having a predetermined modified signalling portion, an electric light source cooperating therewith, and means actuated by light passed from said source through said modified signalling portion of the material for varying the current consumption of said light source.

37. In a photographic apparatus, means for moving a film having thereupon a portion of a degree of translucency different from that of a succeeding portion, means including an electrical source of light cooperating with said film by passing light to said portions so that said light is modified by said differing degree of translucency, means for varying the current consumption of said light source an appreciable amount, and means operable by light as modified by said portions for operating said current varying means.

38. In a photographic apparatus, an electrical source of light, resistance connectible in series therewith, means for connecting said resistance in series therewith, means for bringing an image bearing material into operative position relatively to said light source whereby light from said source reaches an image carried by said material and is modified by the degree of translucency thereof, and means responsive to light from said source as so modified for operating said resistance connecting means thereby changing the amount of resistance in circuit with said light source.

39. In a photographic apparatus, an electric light source, means for bringing an image bearing material into operative position relatively to said light source whereby light from said source reaches an image carried by said material and is modified by the degree of translucency thereof, means for varying the current consumption of said light source, powered means for operating said current-varying means, and means operable by light so modified by said image for actuating said powered means.

40. In a photographic apparatus, an electric light source, means for bringing an image bearing material into operative position relatively to said light source whereby light from said source reaches an image carried by said material and is modified by the degree of translucency thereof, means for varying the current consumption of said light source, powered means for operating said current-varying means, means for controlling the speed of operation of said powered means, and means operable by light so modified by said image for actuating said powered means.

41. In a photographic apparatus, an electric light source, means for bringing an image bearing material into operative position relatively to said light source whereby light from said source reaches an image carried by said material and is modified by the degree of translucency thereof, resistance connectible in circuit with said light source, means for connecting said resistance in said circuit, electro-magnetic means for operating said connecting means, and means operable by light so modified by said image for actuating said electro-magnetic means.

42. In a photographic apparatus, an electric light source, means for bringing an image bearing material into operative position relatively to said light source whereby light from said source reaches an image carried by said material and is modified by the degree of translucency thereof, variable resistance connectible in circuit with said light source, a wiper arm for said resistance, electro-magnetic means including a solenoid having a circuit for moving said wiper arm, and switching means operable by light so modified by said image for closing the circuit of said solenoid.

43. In a photographic apparatus, an electric light source adapted for operation at a predetermined level, means for bringing an image bearing material into operative position relatively to said light source whereby light from said source reaches an image carried by said material and is modified by the degree of translucency thereof, means for varying the current consumption of said light source whereby said source is operated at a level different from said predetermined level, means operable by light so modified by said image for operating said current varying means, and timing means for restoring said light source to said predetermined level a predetermined period after the operation of said current varying means by said operating means.

44. In a photographic apparatus, an electric light source, means for bringing an image bearing material into operative position relatively to said light source whereby light from said source reaches an image carried by said material and is modified by the degree of density thereof, resistance connectible in circuit with said light source, electrical operating means including a control circuit for connecting said resistance in said circuit, means for closing said control circuit operable by light so modified by said image, and means for opening said control circuit a predetermined time after it has been closed.

45. In a film handling apparatus, an electric light source, resistance in series therewith, an image bearing material having a predetermined signalling portion, and means responsive to light from said source as modified by said signalling portion for changing the amount of resistance in circuit with said light source.

46. In a film handling apparatus, an electric light source, means for moving a film past said source, said film having a portion of a degree of translucency differing from that of another portion, and means for appreciably changing the amount of light from said source reaching the film, said means including resistance in the circuit of said light source, means for varying said resistance, a photo-electric cell in the path of light from said source on the opposite side of the film from said source, and means actuable by said photo-electric cell under the influence of light passing through said portions of the film for operating said resistance varying means.

47. In a film handling apparatus, an electric light source, means for moving a film past said source, said film having a portion of a degree of translucency differing from that of another portion, and means for changing the amount of light from said source reaching the film, said means including resistance connectible in the circuit of said light source, switching means for connecting varying amounts of said resistance in said circuit, a photo-electric cell so positioned that it receives light from said source which has reached the film and has been modified by said varying degrees of translucency, and an operating connection between photo-electric cell and said switching means for operating said switching means in accordance with the fluctuations of electrical output of said cell induced by said changes in translucency.

48. In a film handling apparatus, an electric light source, means for moving a film past said source, said film having a portion of a degree of translucency differing from that of another portion, and means for changing the amount of light from said source reaching the film, said means including resistance connectible in the circuit of said light source, switching means for connecting the varying amounts of said resistance in said circuit, a solenoid for operating said switching means, a photo-electric cell so positioned that it receives light which has been modified by said varying degrees of translucency, and an operating connection between said photo-electric cell and said solenoid for operating said solenoid in accordance with the fluctuations in the current proceeding from said cell as it fluctuates under the influence of said differences of translucency.

49. In a film handling apparatus, an electric light source, means for moving a film past said source, said film having a portion of a degree of translucency differing from that of another portion, means for changing the amount of current which reaches said light source, a solenoid for operating said current changing means, a photo-electric cell so positioned that it receives light after it has been modified by said differences in said degree of translucency, and an operating connection between said photo-electric cell and said solenoid for operating said solenoid in accordance with the fluctuations of light caused by said differing degrees of translucency.

50. In a film handling apparatus, means for feeding a film, driving mechanism for said feeding means, a brake operable for reducing the speed of said driving mechanism, means for operating said brake, means operable for operatively connecting and disconnecting said feeding means and said mechanism, a photo-electric cell, a source for directing light through the film and upon said cell, means for varying the intensity of such light, and control mechanism actuated by said cell interlocking said brake operating means, said light varying means and said connecting and disconnecting means, for concomitantly operating said brake device, said varying means and said connecting and disconnecting means.

51. In a film handling apparatus, a support for a film, means for moving the film in relation to said support, driving mechanism for said film moving means, a brake for said driving mechanism, means for controlling the application of said brake to said driving mechanism, an electrical source for passing light to the film, means for changing the amount of current passing through said light source, and means responsive to light passed from said source and modified by the difference in degree of translucency between different portions of the film, the film being formed with such portions, and operatively interconnecting said brake controlling means and said current changing means for concomitantly operating both of said means.

52. In a film handling apparatus, a support for a film, means for moving the film in relation to said support, mechanism for driving said moving means, a brake for said driving mechanism, electro-magnetic means including a control circuit for applying said brake, an electrical source for passing light to the film, means governing the amount of current reaching said light, electro-magnetic means including a control circuit for controlling said current governing means, a photo-electric cell so positioned that it is responsive to light passed to a portion of the film of a degree of translucency differing from other portions thereof, the film being formed with such portions, and an operating connection between said photo-electric cell and said control circuits for concomitantly operating said control circuits by the fluctuations of said photo-electric cell caused by such differences of translucency.

WARREN DUNHAM FOSTER.
PEOPLES-PITTSBURGH
TRUST COMPANY,
*Executor of the Will of Earle L. Parmelee, Deceased,*
By GWILYM A. PRICE,
*Vice President and Trust Officer.*